US010189995B2

(12) United States Patent
Nakajima et al.

(10) Patent No.: US 10,189,995 B2
(45) Date of Patent: Jan. 29, 2019

(54) ASPHALT COMPOSITION

(71) Applicant: Asahi Kasei Kabushiki Kaisha, Tokyo (JP)

(72) Inventors: Shigeo Nakajima, Tokyo (JP); Takayuki Shiromoto, Tokyo (JP); Yukari Hori, Tokyo (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 158 days.

(21) Appl. No.: 15/308,870

(22) PCT Filed: May 8, 2015

(86) PCT No.: PCT/JP2015/063299
§ 371 (c)(1),
(2) Date: Nov. 4, 2016

(87) PCT Pub. No.: WO2015/170739
PCT Pub. Date: Nov. 12, 2015

(65) Prior Publication Data
US 2017/0073519 A1   Mar. 16, 2017

(30) Foreign Application Priority Data

May 8, 2014 (JP) .................................. 2014-096959

(51) Int. Cl.
*C08L 95/00* (2006.01)
*C08L 53/02* (2006.01)
*E01C 7/18* (2006.01)

(52) U.S. Cl.
CPC ............... *C08L 95/00* (2013.01); *C08L 53/02* (2013.01); *E01C 7/18* (2013.01); *C08L 2555/84* (2013.01)

(58) Field of Classification Search
None
See application file for complete search history.

(56) References Cited

U.S. PATENT DOCUMENTS

| 4,145,322 A | 3/1979 | Maldonado et al. |
| 6,120,913 A | 9/2000 | Kluttz et al. |
| 2003/0149140 A1 | 8/2003 | Stephens et al. |
| 2005/0107521 A1 | 5/2005 | Sasagawa et al. |

FOREIGN PATENT DOCUMENTS

| AU | 628390 B2 | 9/1992 |
| JP | S57-024385 B2 | 5/1982 |
| JP | H03-501035 A | 3/1991 |
| JP | 2003-238813 A | 8/2003 |
| JP | 2005-126485 A | 5/2005 |
| JP | 2006-160886 A | 6/2006 |
| JP | 2012-246378 A | 12/2012 |

OTHER PUBLICATIONS

Durand et al., "Assessment of Bitumens for Emulsions and Modified Binders: Characterization by Gel Permeation Chromatography," 5th Eurasphalt & Eurobitume Congress, Istanbul (2012). (Year: 2012).*
Supplementary Search Report issued in counterpart European Patent Application No. 15788850.4 dated Jun. 1, 2017.
Youtcheff et al., "Evaluation of the Laboratory Asphalt Stability Test," U.S. Department of Transportation: Federal Highway Administration, FHWA-HRT-04-111 (2005).
Ping et al., "Research on the Storage Stability Test Method of SBS Modified Asphalt," 2010 International Conference on Intelligent Computation Technology and Automation, 178-181 (2010).
Lesueur, "The colloidal structure of bitumen: Consequences on the rheology and on the mechanisms of bitumen modification," Advances in Colloid and Interface Science, 145: 42-82 (2009).
Airey et al., "Styrene butadiene styrene polymer modification of road bitumens," Journal of Materials Science, 39: 951-959 (2004).
Simpson et al., "Relationship of Asphalt Properties to Chemical Constitution," Journal of Chemical and Engineering Data, 6: 426-429 (1961).
International Search Report issued in corresponding International Patent Application No. PCT/JP2015/063299 dated Jul. 21, 2015.
Sano et al., "Properties of a newly developed asphalt used for regeneration," Hokuriku Doro Hoso Kaigi Gijutsuho Bunshu, D-6 (2012) (see partial English translation).
Murayama et al., "Effects of Microstructures on the Deformation Characteristics of Modified Asphalt Mixtures at High Temperature," Dobokugakkai-hosoukougaku-ronbunshu, 6: 69-76 (2001) (see English abstract).

* cited by examiner

*Primary Examiner* — Catherine S Branch
(74) *Attorney, Agent, or Firm* — Morgan, Lewis & Bockius LLP

(57) ABSTRACT

An asphalt composition containing 0.5 parts by mass or more and 20 parts by mass or less of a block copolymer and 100 parts by mass of an asphalt; the block copolymer comprising a polymer block (A) mainly comprising a vinyl aromatic monomer unit, and a copolymer block (B) containing a conjugated diene monomer unit and a vinyl aromatic monomer unit.

16 Claims, No Drawings

ASPHALT COMPOSITION

TECHNICAL FIELD

The present invention relates to asphalt compositions.

BACKGROUND ART

Asphalt compositions have been used in broad applications to road pavement, sound shielding sheets, and asphalt roofing. Such asphalt compositions have a variety of polymers added to provide the performance according to each application. For example, block copolymers of ethylene-vinyl acetate copolymers, ethylene-ethyl acrylate copolymers, rubber latex, and conjugated diene with vinyl aromatic hydrocarbons are added.

Recently, asphalt compositions having high strength, flow resistance, and wear resistance have been increasingly required with an increase in the number of vehicles running on roads or an increase in speed of vehicles. It is considered that asphalt compositions having higher softening points and enhanced mechanical strength such as elastic modulus are needed to satisfy these requirements, hence leading to attempts at improvement by increasing the molecular weights of the copolymers listed above.

Unfortunately, these asphalt compositions do not have sufficient performance in the storage stability during storage at high temperature. In addition, these asphalt compositions have high melt viscosities, resulting in inferior applicability during road pavement.

Because of these, the storage stability is improved through addition of aromatic oils, sulfur, or peroxide, followed by crosslinking.

For example, techniques using sulfur (for example, see Patent Literature 1), and those using sulfur and a vulcanizing agent in combination with a sulfur-containing vulcanization accelerator are disclosed (for example, see Patent Literature 2).

An asphalt composition comprising a copolymer composed of a conjugated diene having a specific structure and a vinyl aromatic hydrocarbon is disclosed (for example, see Patent Literature 3).

An asphalt composition for roofing shingles comprising a block copolymer composed of a vinyl aromatic hydrocarbon and a conjugated diene and a filler is disclosed (for example, see Patent Literature 4).

An asphalt composition comprising a block copolymer composed of a vinyl aromatic hydrocarbon and a conjugated diene and a hydrogenated copolymer having hydrogen added thereto is disclosed (for example, see Patent Literature 5).

CITATION LIST

Patent Literature

Patent Literature 1: Japanese Patent Publication No. S57-24385
Patent Literature 2: Japanese Patent Laid-Open No. H03-501035
Patent Literature 3: U.S. Patent Laid-Open No. 2003/0149140
Patent Literature 4: U.S. Pat. No. 6,120,913
Patent Literature 5: Japanese Patent Laid-Open No. 2003-238813

SUMMARY OF INVENTION

Technical Problem

However, satisfactory storage stability during storage at high temperature is not obtained yet in the methods for improving asphalt compositions disclosed in Patent Literatures 1 and 2, and a further improvement in storage stability during storage at high temperature is desired.

The composition disclosed in Patent Literature 3 does not have a good balance between the softening point and the storage stability at high temperature, and has inferior ductility.

The composition disclosed in Patent Literature 4 comprises a typical block copolymer composed of a vinyl aromatic hydrocarbon and a conjugated diene. For this reason, the composition has insufficient storage stability at high temperature, and therefore cannot be used as shingles for asphalt waterproof sheets.

The composition disclosed in Patent Literature 5 contains a large amount of a vinyl aromatic compound, which results in high storage stability at high temperature. However, the composition does not have a sufficient softening point and sufficient ductility, and cannot be used in road pavement.

It is known that the proportion of the four components of asphalt, i.e., A: saturate fraction, B: asphaltene fraction, C: resin fraction, and D: aromatic fraction, is varied according to the area of production of crude oil and the refinery thereof. The physical properties of the asphalt composition are significantly affected by the difference in the proportions of these components because of the structure of the polymer, resulting in asphalt compositions having a low softening point, insufficient storage stability at high temperature that can be determined from a change in softening point after storage at high temperature, inferior rutting resistance, and inferior solubility.

The present invention has been made in consideration of these problems described above. An object of the present invention is to provide an asphalt composition having a high softening point, high ductility, low melt viscosity, high rutting resistance, and high storage stability at high temperature.

Solution to Problem

The present inventors, who have conducted extensive research to solve the problems above, have found that the problems can be solved by a composition comprising a block copolymer having a specific structure and an asphalt comprising a specific composition, and have completed the present invention.

Namely, the present invention is as follows.

[1]
An asphalt composition, comprising
0.5 parts by mass or more and 20 parts by mass or less of a block copolymer, and
100 parts by mass of an asphalt;
the block copolymer comprising a polymer block (A) mainly comprising a vinyl aromatic monomer unit, and a copolymer block (B) containing a conjugated diene monomer unit and a vinyl aromatic monomer unit; the content of the vinyl aromatic monomer unit in the block copolymer being 20% by mass or more and 60% by mass or less;
a content of the polymer block (A) in the block copolymer being 10% by mass or more and 40% by mass or less;

a hydrogenation rate of a double bond in the conjugated diene monomer unit of the block copolymer being 40% or more and 100% or less; and the asphalt having a colloidal index ((a saturate fraction content+an asphaltene fraction content)/(a resin fraction content+an aromatic fraction content)) of 0.30 or more and 0.54 or less, and a saturate fraction content of 11% by mass or less.

[2]

The asphalt composition according to above-described [1], wherein the block copolymer has a peak top of a loss tangent in the range of −70° C. or more and 0° C. or less in a spectrum of a dynamic viscoelasticity, and the value of the peak top is 0.7 or more and 2.0 or less.

[3]

The asphalt composition according to above-described [1] or [2], wherein the block copolymer has a peak top of a loss tangent in the range of −45° C. or more and −20° C. or less in the spectrum of the dynamic viscoelasticity.

[4]

The asphalt composition according to any one of above-described [1] to [3], wherein the colloidal index (Ci) of the asphalt and the peak temperature (Tg (° C.)) of the loss tangent in the spectrum of dynamic viscoelasticity of the block copolymer satisfy the following relationship:

$$Ci \leq 0.0127 \times Tg + 0.94$$

[5]

The asphalt composition according to any one of above-described [1] to [4], wherein the hydrogenation rate of the double bond in the conjugated diene monomer unit of the block copolymer is 50% or more and 90% or less.

[6]

The asphalt composition according to any one of above-described [1] to [5], wherein the hydrogenation rate of the double bond in the conjugated diene monomer unit of the block copolymer is 60% or more and 90% or less.

[7]

The asphalt composition according to any one of above-described [1] to [6], wherein the conjugated diene monomer unit of the block copolymer comprises a conjugated diene monomer unit (a) derived from a 1,2-bond and/or a 3,4-bond and a conjugated diene monomer unit (b) derived from a 1,4-bond, and where a total content of the conjugated diene monomer units is 100% by mass, a content of an alkenyl monomer unit (a1) in the conjugated diene monomer unit (a) hydrogenated is 10% by mass or more and 50% by mass or less, a content of an alkenyl monomer unit (b1) in the conjugated diene monomer unit (b) hydrogenated is 0% by mass or more and 80% by mass or less, and a sum of contents of a non-hydrogenated conjugated diene monomer unit (a2) after hydrogenation and a non-hydrogenated conjugated diene monomer unit (b2) after hydrogenation is 0% by mass or more and 90% by mass or less.

[8]

The asphalt composition according to any one of above-described [1] to [7], wherein the block copolymer has a weight average molecular weight of 50000 or more and 300000 or less.

[9]

The asphalt composition according to any one of above-described [1] to [8], wherein the block copolymer has at least one functional group selected from the group consisting of a hydroxyl group, an acid anhydride group, an epoxy group, an amino group, an amide group, a silanol group, and an alkoxysilane group.

[10]

The asphalt composition according to any of above-described [1] to [9], wherein a content of the conjugated diene monomer unit (a) derived from a 1,2-bond and/or a 3,4-bond is 10% by mass or more and 50% by mass or less based on the total content of the conjugated diene monomer units of the block copolymer.

[11]

The asphalt composition according to any one of above-described [1] to [10], wherein the asphalt has a penetration of more than 60 and 80 or less.

Advantageous Effects of Invention

The present invention can provide an asphalt composition having a high softening point, high ductility, low melt viscosity, high rutting resistance, and high storage stability at high temperature.

DESCRIPTION OF EMBODIMENT

An embodiment for implementing the present invention (hereinafter, referred to as "the present embodiment") will now be described in detail. The present invention will not be limited to the present embodiment below, and can be modified and implemented in various ways within the scope of the gist.

[Asphalt Composition]

The asphalt composition according to the present embodiment comprises 0.5 parts by mass or more and 20 parts by mass or less of a block copolymer, and 100 parts by mass of an asphalt;

the block copolymer comprising a polymer block (A) mainly comprising a vinyl aromatic monomer unit, and a copolymer block (B) containing a conjugated diene monomer unit and a vinyl aromatic monomer unit;

the content of the vinyl aromatic monomer unit in the block copolymer being 20% by mass or more and 60% by mass or less;

the content of the polymer block (A) in the block copolymer being 10% by mass or more and 40% by mass or less;

the hydrogenation rate of the double bond in the conjugated diene monomer unit of the block copolymer being 40% or more and 100% or less; and the asphalt having a colloidal index ((saturate fraction content+asphaltene fraction content)/(resin fraction content+aromatic fraction content)) of 0.30 or more and 0.54 or less, and a saturate fraction content of 11% by mass or less.

[Block Copolymer]

The block copolymer according to the present embodiment includes the polymer block (A) mainly comprising a vinyl aromatic monomer unit, and the copolymer block (B) comprising a conjugated diene monomer unit and a vinyl aromatic monomer unit. The content of the vinyl aromatic monomer unit is 20% by mass or more and 60% by mass or less. The content of the polymer block (A) is 10% by mass or more and 40% by mass or less. The hydrogenation rate of the double bond in the conjugated diene monomer unit is 40% or more and 100% or less.

In the present embodiment, the term "conjugated diene monomer unit" indicates a unit per conjugated diene compound generated as a result of polymerization of the conjugated diene compound. Throughout the specification, the conjugated diene monomer unit is referred to as a "conjugated diene monomer unit" regardless of being before and after hydrogenation.

The conjugated diene compound is a diolefin having a pair of conjugate double bonds. Examples of the conjugated diene compound include, but should not be particularly limited to, 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene. Among these conjugated diene compounds, preferred are 1,3-butadiene and isoprene. These conjugated diene compounds may be used singly or in combination.

In the present embodiment, the term "vinyl aromatic monomer unit" indicates a unit per vinyl aromatic compound generated as a result of polymerization of the vinyl aromatic compound.

Examples of the vinyl aromatic compound include, but should not be particularly limited to, styrene, α-methylstyrene, p-methylstyrene, divinylbenzene, 1,1-diphenylethylene, N,N-dimethyl-p-aminoethylstyrene, and N,N-diethyl-p-aminoethylstyrene. These vinyl aromatic compounds may be used singly or in combination.

[Polymer Block (A)]

In the present embodiment, the polymer block (A) is a block mainly comprising a vinyl aromatic monomer unit. Throughout the specification, the term "mainly comprising" indicates that the polymer block (A) contains the vinyl aromatic monomer unit in a proportion of more than 95% by mass and 100% by mass or less, preferably 96% by mass or more and 100% by mass or less, more preferably 97% by mass or more and 100% by mass or less.

The content of the polymer block (A) is 10% by mass or more and 40% by mass or less, preferably 13% by mass or more and 35% by mass or less, more preferably 20% by mass or more and 30% by mass or less, still more preferably 17% by mass or more and 22% by mass or less based on the total block copolymer. The polymer block (A) contained in the polymer in a content within this range further enhances the softening point and the storage stability at high temperature.

In the present embodiment, using the mass of the vinyl aromatic polymer block component (where vinyl aromatic polymer block components having an average degree of polymerization of about 30 or less are excluded) determined by the method of decomposing a polymer into tertiary butyl hydroperoxide by oxidation in the presence of a catalyst osmium tetroxide (method described in I. M. KOLTHOFF, et. al, J. Polym. Sci. 1, p. 429 (1946)), the content of the polymer block (A) can be determined from the following formula:

content (% by mass) of polymer block (A)=(mass of vinyl aromatic polymer block component/mass of polymer)×100

In the hydrogenated polymer, the content of the polymer block (A) in the polymer is approximately equal to the content of the polymer block (A) relative to the polymer before hydrogenation. Accordingly, the content of the polymer block (A) in the hydrogenated polymer may be determined as a content of the polymer block (A) before hydrogenation in the present embodiment.

[Polymer Block (B)]

In the present embodiment, the copolymer block (B) is a block comprising a conjugated diene monomer unit and a vinyl aromatic monomer unit, preferably a block comprising 5% by mass or more and 95% by mass or less of a vinyl aromatic monomer unit.

In the present embodiment, the content of the vinyl aromatic monomer unit in the copolymer block (B) is preferably 5% by mass or more, more preferably 20% by mass or more, still more preferably 25% by mass or more from the viewpoint of the softening point and the rutting resistance (G*/sin δ) of the asphalt composition. The content of the vinyl aromatic monomer unit in the copolymer block (B) is preferably 95% by mass or less, more preferably 50% by mass or less, still more preferably 35% by mass or less, further still more preferably 30% by mass or less from the viewpoint of the storage stability at high temperature and the ductility of the asphalt composition.

The content (RS) of the vinyl aromatic monomer unit in the copolymer block (B) can be determined by subtracting the content (BS) of the polymer block (A) from the content (TS) of the vinyl aromatic monomer unit in the block copolymer.

$$RS(\%)=(TS-BS)/(100-BS)\times 100$$

The rutting resistance is usually determined based on the dynamic stability (DS value) of a mixture comprising the same aggregate as that actually used in road pavement, the dynamic stability being determined by a wheel tracking test. In the asphalt composition according to the present embodiment, the value of G*/sin δ as an index of the dynamic stability in Examples described later can be measured to determine the rutting resistance.

The copolymer block (B) is preferably a random block. Throughout the specification, the term "random" indicates a state where a sequence of vinyl aromatic monomer units in the block copolymer is composed of 10 or less vinyl aromatic monomer units.

The content of the copolymer block (B) is preferably 60% by mass or more and 90% by mass or less, more preferably 65% by mass or more and 85% by mass or less, still more preferably 70% by mass or more and 80% by mass or less based on the block copolymer. The copolymer block (B) contained in the block copolymer in a content within this range tends to further enhance the solubility of the block copolymer in the asphalt composition and the softening point.

The content of short chain polymerized portions of a vinyl aromatic monomer in the copolymer block (B) in the present embodiment is preferably 50% by mass or more, more preferably 70% by mass or more, still more preferably 80% by mass or more, further still more preferably 90% by mass or more based on 100% by mass of the content of the vinyl aromatic monomer unit in the polymer block (B). The upper limit of the content of the short chain polymerized portions of a vinyl aromatic monomer in the copolymer block (B) is not particularly limited. The content is preferably 100% by mass or less, more preferably 99% by mass or less. A content of the short chain polymerized portions of a vinyl aromatic monomer in the polymer block (B) within this range tends to further enhance the miscibility between the block copolymer and the asphalt and the ductility and the storage stability at high temperature.

Throughout the specification, the term "short chain polymerized portions of a vinyl aromatic monomer" indicates a component composed of 2 to 6 vinyl aromatic monomer units in the polymer block (B). The content of the short chain polymerized portions of a vinyl aromatic monomer is determined as a content of portions composed of 2 to 6 connected vinyl aromatic monomer units based on 100% by mass of the vinyl aromatic monomer unit in the polymer block (B).

The content of a portion composed of 2 connected vinyl aromatic monomer units is preferably 10% by mass or more and 45% by mass or less, more preferably 13% by mass or more and 42% by mass or less, still more preferably 19% by mass or more and 36% by mass or less based on 100% by mass of the content of the vinyl aromatic monomer unit in the polymer block (B). A content of the portion composed of 2 connected vinyl aromatic monomer units tends to further enhance the miscibility between the block copolymer and the asphalt and the ductility and the storage stability at high temperature.

Furthermore, the content of a portion composed of 3 connected vinyl aromatic monomer units is preferably 45% by mass or more and 80% by mass or less, more preferably 45% by mass or more and 75% by mass or less, still more preferably 45% by mass or more and 65% by mass or less based on 100% by mass of the content of the vinyl aromatic monomer unit in the polymer block (B). A content of the portion composed of 3 connected vinyl aromatic monomer units tends to further enhance the miscibility between the block copolymer and the asphalt and the ductility and the storage stability at high temperature.

In the present embodiment, the content of the vinyl aromatic monomer unit is 20% by mass or more and 60% by mass or less, preferably 33% by mass or more and 55% by mass or less, more preferably 37% by mass or more and 48% by mass or less, still more preferably 40% by mass or more and 45% by mass or less based on the block copolymer. A content of the vinyl aromatic monomer unit in the block copolymer within this range further enhances the softening point, the ductility, and the balance between the softening point and the ductility of the asphalt composition. The content of the vinyl aromatic monomer unit can be measured by the method in Examples described later.

In the hydrogenated block copolymer, the content of the vinyl aromatic monomer unit relative to the block copolymer is approximately equal to the content of the vinyl aromatic monomer unit relative to the block copolymer before hydrogenation. Accordingly, the content of the vinyl aromatic monomer unit in the hydrogenated block copolymer may be determined as a content of the vinyl aromatic monomer unit before hydrogenation.

In the present embodiment, the hydrogenation rate (mol %) of the content of the hydrogenated conjugated diene monomer unit in the total content of the conjugated diene monomer units, that is, the hydrogenation rate of the double bond in the conjugated diene monomer unit is 40% or more and 100% or less, preferably 40% or more and 95% or less, more preferably 50% or more and 90% or less, still more preferably 60% or more and 90% or less. A hydrogenation rate in the block copolymer within this range results in high compatibility with the asphalt and a good balance of performance between the softening point, the ductility, and the storage stability at high temperature. In the present embodiment, the hydrogenation rate can be determined by the method in Examples described later.

The block copolymer preferably has a peak top of the loss tangent in the range of −70° C. or more and 0° C. or less in the spectrum of dynamic viscoelasticity. The value of the peak top is preferably 0.7 or more and 2.0 or less. An asphalt composition tends to have a further enhanced balance of performance between the softening point, the ductility, and the rutting resistance (G*/sin δ).

The peak top of the loss tangent is in the range of more preferably −50° C. or more and −10° C. or less, still more preferably −45° C. or more and −20° C. or less from the viewpoint of the balance of performance between the softening point and the ductility and the rutting resistance (G*/sin δ) of the asphalt composition.

The value of the peak top is more preferably 0.8 or more and 1.6 or less, still more preferably 0.9 or more and 1.4 or less, further still more preferably 1.0 or more and 1.3 or less from the viewpoint of the softening point and the ductility of the asphalt composition. The peak height of tan δ and the temperature thereof can be determined by the method in Examples described later.

The peak temperature of tan δ can be adjusted through control of the proportion of the content of the vinyl aromatic monomer unit and that of the conjugated diene monomer unit in the copolymer block (B), the microstructure of the conjugated diene compound, and the hydrogenation rate, for example, such that the peak top of tan δ is in the range of −70° C. or more and 0° C. or less. For example, if the proportion of the vinyl aromatic monomer unit in the copolymer block (B) is increased, the peak top of tan δ tends to be shifted to the high temperature side; if the proportion of the vinyl aromatic monomer unit is decreased, the peak top of tan δ tends to be shifted to the low temperature side.

The peak top value can be adjusted to 0.7 or more and 2.0 or less through control of the temperature and the time or the number of times to add the monomers in the polymerization of the copolymer block (B). Specifically, the inner temperature of the reactor is controlled within the range of 56 to 90° C., and the internal pressure of the reactor is controlled within the range of 0.1 MPa to 0.50 MPa. The conjugated diene monomer and the vinyl aromatic monomer are added at a predetermined rate for a time within the range of 10 to 60 minutes, or the number of additions is 3 times or more. Alternatively, because the peak top value tends to depend on the temperature during the hydrogenation reaction, the temperature during the hydrogenation reaction is controlled to 80° C. or more and 120° C. or less in addition to any of the methods above. The peak top value will be close to the range of 0.7 or more and 2.0 or less.

In the present embodiment, the conjugated diene monomer unit consists of a conjugated diene monomer unit (a) derived from a 1,2-bond and/or a 3,4-bond and a conjugated diene monomer unit (b) derived from a 1,4-bond.

Throughout the specification, the term "conjugated diene monomer unit (a) derived from a 1,2-bond and/or a 3,4-bond" indicates a unit per conjugated diene compound generated as a result of polymerization of the conjugated diene compound at a 1,2-bond and/or a 3,4-bond. The term "conjugated diene monomer unit (b) derived from a 1,4-bond" indicates a unit per conjugated diene compound generated as a result of polymerization of the conjugated diene compound at a 1,4-bond.

The content of the conjugated diene monomer unit (a) (hereinafter, also referred to as vinyl bond content) based on the total content of the conjugated diene monomer units in the block copolymer is preferably 10% by mass or more and 50% by mass or less, more preferably 15% by mass or more and 45% by mass or less, still more preferably 20% by mass or more and 40% by mass or less from the viewpoint of the balance of performance between the softening point and the ductility of the asphalt composition.

In the present embodiment, where the total content of the conjugated diene monomer units is 100% by mass, preferably, the content of the alkenyl monomer unit (a1) in the conjugated diene monomer unit (a) hydrogenated is 10% by mass or more and 50% by mass or less, the content of the alkenyl monomer unit (b1) in the conjugated diene monomer unit (b) hydrogenated is 0% by mass or more and 80% by mass or less, and the sum of the contents of the non-hydrogenated conjugated diene monomer unit (a2) after hydrogenation and the non-hydrogenated conjugated diene monomer unit (b2) after hydrogenation is 0% by mass or more and 90% by mass or less. Use of such a block copolymer tends to further enhance the balance of performance between the softening point and the ductility of the asphalt composition.

The content of the alkenyl monomer unit (a1) is preferably 15% by mass or more and 45% by mass or less, more preferably 20% by mass or more and 40% by mass or less from the viewpoint of the balance of performance between the softening point and the ductility of the asphalt composition.

The content of the alkenyl monomer unit (b1) is preferably 10% by mass or more and 70% by mass or less, more preferably 15% by mass or more and 65% by mass or less, still more preferably 30% by mass or more and 65% by mass or less from the viewpoint of the balance of performance between the softening point and the ductility of the asphalt composition.

Furthermore, the sum of the contents of the conjugated diene monomer unit (a2) and the conjugated diene monomer unit (b2) is preferably 0% by mass or more and 80% by mass or less, more preferably 5% by mass or more and 70% by mass or less, still more preferably 10% by mass or more and 60% by mass or less from the viewpoint of the balance of performance between the softening point and the ductility of the asphalt composition.

The contents of the alkenyl monomer unit (a1) in the conjugated diene monomer unit (a) hydrogenated, the alkenyl monomer unit (b1) in the conjugated diene monomer unit (b) hydrogenated, the non-hydrogenated alkenyl monomer unit (a2), and the non-hydrogenated alkenyl monomer unit (b2) can be determined by the method in Examples described later.

The content of the conjugated diene monomer unit (a) in the block copolymer before hydrogenation and the microstructure (proportion of cis, trans, and vinyl) of the conjugated diene monomer unit can be adjusted by use of a polar compound described later.

The block copolymer used in the present embodiment preferably has at least one functional group selected from the group consisting of a hydroxyl group, an acid anhydride group, an epoxy group, an amino group, an amide group, a silanol group, and an alkoxysilane group in view of high ductility, high stretch recovery, and high ductility at low temperature such as 5° C. of the asphalt composition. Among these functional groups, the block copolymer more preferably has at least one functional group selected from an amino group and an amide group, still more preferably has an amino group. The block copolymer more preferably has 2 mol or more of the at least one functional group selected from an amino group and an amide group per mol of the molecule. The functional group described above can be introduced by the method of producing a block copolymer described later.

In the present embodiment, the melt flow rate (MFR) of the block copolymer is preferably 0.05 or more and 10 or less, more preferably 0.05 or more and 8 or less, still more preferably 0.05 or more and 6 or less. An MFR of the block copolymer within this range will lead to a good balance between the processability and the softening point of the asphalt composition. The MFR can be determined through measurement of the hydrogenated block copolymer with a Melt Indexer (L247; manufactured by TECHNOL SEVEN CO., LTD) and calculation by a method according to JIS K7210. The measurement is preferably performed on a condition L at a test temperature of 230° C. under a test load of 2.16 kgf in unit for the measured value of g/10 min.

In the present embodiment, the block copolymer has a weight average molecular weight (Mw) of preferably 50000 or more and 300000 or less, more preferably 60000 or more and 280000 or less, still more preferably 70000 or more and 260000 or less, further still more preferably 70000 or more and less than 200000 from the viewpoint of the balance between the softening point and the melt viscosity of the asphalt composition.

In the present embodiment, the block copolymer has a molecular weight distribution (Mw/Mn) (ratio of the weight average molecular weight (Mw) to the number average molecular weight (Mn)) of preferably 2.0 or less, more preferably 1.8 or less, still more preferably 1.5 or less from the viewpoint of the balance between the softening point and the melt viscosity of the asphalt composition.

The weight average molecular weight and the molecular weight distribution can be determined by the method in Examples described later. The weight average molecular weight and the molecular weight distribution of the hydrogenated block copolymer are approximately equal to the weight average molecular weight and the molecular weight distribution of the block copolymer before hydrogenation. Accordingly, the weight average molecular weight and the molecular weight distribution of the hydrogenated block copolymer may be determined as the weight average molecular weight and the molecular weight distribution of the block copolymer before hydrogenation.

In the present embodiment, the block copolymer used can have any structure. Examples thereof include structures represented by the following formulae:

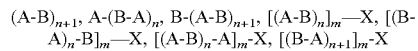

where A each independently represents a polymer block (A); B each independently represents a copolymer block (B); n is each independently an integer of 1 or more, preferably an integer of 1 to 5; m is each independently an integer of 2 or more, preferably an integer of 2 to 11; and X each independently represents a residue of a coupling agent or a residue of a polyfunctional initiator.

The block copolymer may be any mixture of block copolymers having the structures represented by the above formulae. Among these structures, preferred is the structure A-B-A in view of the balance of performance of the asphalt binder.

In the present embodiment, the vinyl aromatic monomer unit in the copolymer block (B) may be uniformly distributed, or may be distributed in a tapered manner, in a stepwise manner, in a projected manner, or in a depressed manner. Throughout the specification, the term "tapered structure" indicates a structure in which the content of the vinyl aromatic monomer unit is gradually increased along the polymer chain of the copolymer block (B). The relationships S2/S1>1 and S3/S2>1 are established in the tapered structure where the content of the vinyl aromatic monomer unit in the copolymer block (B) immediately after the start of polymerization of the copolymer block (B) is S1, the content of the vinyl aromatic monomer unit in the copolymer during polymerization, for example, when ½ of the introduced monomer is polymerized is S2, and the content of the vinyl aromatic monomer unit in the copolymer block (B) after polymerization is completed is S3.

A plurality of portions where the vinyl aromatic monomer unit is uniformly distributed and/or a plurality of portions where the vinyl aromatic monomer unit is distributed in a tapered manner may be present in the copolymer block (B). A plurality of segments having the vinyl aromatic monomer unit in different contents may be present in the copolymer block (B).

[Method of Producing Block Copolymer]

The block copolymer according to the present embodiment can be produced in a hydrocarbon solvent using a polymerization initiator such as an organic alkali metal compound by anion living polymerization, for example.

Examples of the hydrocarbon solvent include, but should not be particularly limited to, aliphatic hydrocarbons such as n-butane, isobutane, n-pentane, n-hexane, n-heptane, and n-octane; alicyclic hydrocarbons such as cyclohexane, cycloheptane, and methylcycloheptane; and aromatic hydrocarbons such as benzene, toluene, xylene, and ethylbenzene.

Examples of the polymerization initiator include, but should not be particularly limited to, aliphatic hydrocarbon alkali metal compounds, aromatic hydrocarbon alkali metal compounds, and organic aminoalkali metal compounds, which have anionic polymerization activity to the conjugated diene and the vinyl aromatic compound. Examples of alkali metals include, but should not be particularly limited to, lithium, sodium, and potassium.

In the present embodiment, during polymerization of the conjugated diene compound with the vinyl aromatic compound using an organic alkali metal compound as a polymerization initiator, a tertiary amine compound or an ether compound as a polar compound may be added to adjust the vinyl bond content (1,2-bond or 3,4-bond) attributed to the conjugated diene monomer unit incorporated into the block copolymer and the random polymerizability between the conjugated diene and the vinyl aromatic compound.

Examples of the tertiary amine compound include, but should not be particularly limited to, compounds represented by the formula $R^1R^2R^3N$ where $R^1$, $R^2$, and $R^3$ are each independently a hydrocarbon group having hydrocarbon group having 1 to 20 carbon atoms or a tertiary amino group.

Specifically, examples thereof include trimethylamine, triethylamine, tributylamine, N,N-dimethylaniline, N-ethylpiperidine, N-methylpyrrolidine, N,N,N',N'-tetramethylethylenediamine, N,N,N',N'-tetraethylethylenediamine, 1,2-dipiperidinoethane, trimethylaminoethylpiperazine, N,N,N',N'',N''-pentamethylethylenetriamine, and N,N'-dioctyl-p-phenylenediamine.

Examples of the ether compound include, but should not be particularly limited to, linear ether compounds and cyclic ether compounds.

Specifically, examples of the linear ether compound include, but should not be particularly limited to, dimethyl ether, diethyl ether, diphenyl ether; dialkyl ether compounds of ethylene glycol such as ethylene glycol dimethyl ether, ethylene glycol diethyl ether, and ethylene glycol dibutyl ether; and dialkyl ether compounds of diethylene glycol such as diethylene glycol dimethyl ether, diethylene glycol diethyl ether, and diethylene glycol dibutyl ether.

Specifically, examples of the cyclic ether compound include, but should not be particularly limited to, alkyl ethers of tetrahydrofuran, dioxane, 2,5-dimethyloxolane, 2,2,5,5-tetramethyloxolane, 2,2-bis(2-oxolanyl)propane, and furfuryl alcohol.

In the present embodiment, the method of polymerizing the conjugated diene compound with the vinyl aromatic compound using the organic alkali metal compound as a polymerization initiator may be batch polymerization, continuous polymerization, or a combination thereof. The polymerization temperature is generally 0° C. or more and 180° C. or less, preferably 30° C. or more and 150° C. or less. Although the time needed for polymerization varies according to other conditions, the time is generally within 48 hours, preferably 0.1 to 10 hours. The atmosphere of the polymerization system is preferably an atmosphere of an inert gas such as nitrogen gas. Polymerization can be performed at any pressure within the range of a sufficient pressure that can maintain the monomer and the solvent in liquid phases at a temperature within the range of the polymerization temperature. Polymerization should be carefully operated so as to keep the polymerization system from invasion of impurities which deactivate the catalyst and the living polymer (such as water, oxygen, and carbon dioxide gas).

In the present embodiment, a coupling reaction can also be performed with a bi- or higher functional coupling agent at the end of polymerization. Any known bi- or higher functional coupling agent can be used.

Examples of the bifunctional coupling agent include, but should not be particularly limited to, dihalogen compounds such as dimethyldichlorosilane and dimethyldibromosilane; and acid esters such as methyl benzoate, ethyl benzoate, phenyl benzoate, and phthalic acid esters.

Examples of polyfunctional coupling agents such as tri- or higher functional coupling agents include, but should be particularly limited to, polyhydric alcohols such as tri- or higher hydric alcohols; polyvalent epoxy compounds such as epoxidated soybean oil and diglycidyl bisphenol A; and polyvalent halogen compounds such as halogenated silicon compounds represented by the formula $R_{4-n}SiX_n$ (where R each independently represents a hydrocarbon group having 1 to 20 carbon atoms, X each independently represents a halogen atom; and n represents 3 or 4), such as methylsilyl trichloride, t-butylsilyl trichloride, silicon tetrachloride, and brominated products thereof; and halogenated tin compounds represented by the formula $R_{4-n}SnX_n$ (where R each independently represents a hydrocarbon group having 1 to 20 carbon atoms, X each independently represents a halogen atom; and n represents 3 or 4), such as methyltin trichloride, t-butyltin trichloride, and tin tetrachloride. Dimethyl carbonate and diethyl carbonate can also be used as the polyfunctional coupling agent.

A functional group can be added to the resulting block copolymer by use of a compound having a functional group as an initiator, a monomer, a coupling agent, or a terminator.

A preferred initiator having a functional group is an initiator having a nitrogen-containing group. Examples thereof include dioctylaminolithium, di-2-ethylhexylaminolithium, ethylbenzylaminolithium, (3-(dibutylamino)-propyl)lithium, and piperidinolithium.

Examples of the monomer having a functional group include compounds of the monomers used in polymerization described above having a hydroxyl group, an acid anhydride group, an epoxy group, an amino group, an amide group, a silanol group, and an alkoxysilane group. Among these compounds, preferred are monomers having nitrogen-containing groups. Examples thereof include N,N-dimethylvinylbenzylamine, N,N-diethylvinylbenzylamine, N,N-dipropylvinylbenzylamine, N,N-dibutylvinylbenzylamine, N,N-diphenylvinylbenzylamine, 2-dimethylaminoethylstyrene, 2-diethylaminoethylstyrene, 2-bis(trimethylsilyl)aminoethylstyrene, 1-(4-N,N-dimethylaminophenyl)-1-phenylethylene, N,N-dimethyl-2-(4-vinylbenzyloxy)ethylamine, 4-(2-pyrrolidinoethyl)styrene, 4-(2-piperidinoethyl)styrene, 4-(2-hexamethyleneiminoethyl)styrene, 4-(2-morpholinoethyl)styrene, 4-(2-thiazinoethyl)styrene, 4-(2-N-methylpiperazinoethyl)styrene, 1-((4-vinylphenoxy)methyl) pyrrolidine, and 1-(4-vinylbenzyloxymethyl)pyrrolidine.

Examples of the coupling agent and the terminator having functional groups include the coupling agents listed above having a hydroxyl group, an acid anhydride group, an epoxy group, an amino group, an amide group, a silanol group, and an alkoxysilane group.

Among these coupling agents, preferred are those having a nitrogen-containing group or an oxygen-containing group. Examples thereof include tetraglycidyl meta-xylene diamine, tetraglycidyl-1,3-bisaminomethylcyclohexane, tetraglycidyl-p-phenylenediamine, tetraglycidyldiaminodiphenylmethane, diglycidylaniline, γ-caprolactone, γ-glycidoxyethyltrimethoxysilane, γ-glycidoxypropyltrimethoxysilane, γ-glycidoxypropyltriphenoxysilane, γ-glycidoxypropylmethyldimethoxysilane, γ-glycidoxypropyldiethylethoxysilane, 1,3-dimethyl-2-imidazolidinone, 1,3-diethyl-2-imidazolidinone, N,N'-dimethylpropyleneurea, and N-methylpyrrolidone.

[Hydrogenation Method]

In the present embodiment, the method of hydrogenating the block copolymer is not particularly limited and the block copolymer can be hydrogenated by any known method.

Any hydrogenating catalyst can be used in hydrogenation of the block copolymer. The following conventionally known catalysts are used: carrier-type, heterogeneous hydrogenating catalysts composed of carbon, silica, alumina, and diatomite carrying metals such as Ni, Pt, Pd, and Ru; so-called Ziegler hydrogenating catalysts using transition metal salts, such as organic acid salts or acetylacetone salts of Ni, Co, Fe, and Cr, and reducing agents such as organic aluminum; and homogeneous hydrogenating catalysts such as so-called organic metal complexes such as organic metal compounds of Ti, Ru, Rh, and Zr.

Examples of usable hydrogenating catalysts include hydrogenating catalysts described in Japanese Patent Publication No. 63-4841, Japanese Patent Publication No. 1-53851, and Japanese Patent Publication No. 2-9041. Examples of preferred hydrogenating catalysts include mixtures of titanocene compounds and/or reducing organic metal compounds.

A usable titanocene compound is a compound described in Japanese Patent Laid-Open No. 8-109219. Specifically, examples thereof include compounds having at least one or more ligands having a (substituted) cyclopentadienyl skeleton, an indenyl skeleton, or a fluorenyl skeleton, such as biscyclopentadienyltitanium dichloride and monopentamethylcyclopentadienyltitanium trichloride.

Examples of the reducing organic metal compound include organic alkali metal compounds composed of organic lithium, organic magnesium compounds, organic aluminum compounds, organic boron compounds, or organic zinc compounds.

The hydrogenation reaction of the block copolymer is generally performed within the range of a temperature of 0 to 200° C., preferably 30 to 150° C. The pressure of hydrogen used in the hydrogenation reaction is generally 0.1 MPa or more and 15 MPa or less, preferably 0.2 MPa or more and 10 MPa or less, more preferably 0.3 MPa or more and 5 MPa or less. The time for the hydrogenation reaction is generally 3 minutes to 10 hours, preferably 10 minutes to 5 hours. The hydrogenation reaction can be performed in a batch process, a continuous process, or a combination thereof.

The catalyst residues can be removed, when necessary, from the solution of the hydrogenated block copolymer thus obtained, and the hydrogenated block copolymer can be separated from the solution. Examples of the method of separating the solvent can include a method of adding a polar solvent serving as a poor solvent to the hydrogenated block copolymer, such as acetone or alcohol, to the reaction solution after hydrogenation to deposit the block copolymer, and recovering the deposit; a method of charging the reaction solution in hot water under stirring to remove the solvent by steam stripping, and recovering the hydrogenated block copolymer; or a method of directly heating the block copolymer solution to distill off the solvent. The block copolymer according to the present embodiment can contain a variety of stabilizers such as phenol stabilizers, phosphorus stabilizers, sulfur stabilizers, and amine stabilizers.

[Asphalt]

Examples of the asphalt that can be used in the present embodiment include, but should not be particularly limited to, by-products during refining of petroleum (petroleum asphalts), those obtained as natural products (natural asphalts), or mixtures of these products and petroleums. Its main component is referred to as black pitch (bitumen). Specifically, examples thereof include straight asphalt, semi-blown asphalt, blown asphalt, tar, pitch, oil-added cutback asphalt, and asphalt emulsions. These asphalts may be used singly or in combinations of two or more.

The asphalt of the present embodiment has a colloidal index ((saturate fraction content (% by mass)+asphaltene fraction content (% by mass))/(resin fraction content (% by mass)+aromatic fraction content (% by mass)) of 0.30 or more and 0.54 or less, and has a saturate fraction content of 11% by mass or less from the viewpoint of the softening point and the rutting resistance (G*/sin δ) of the asphalt composition. The colloidal index is preferably 0.31 or more, more preferably 0.32 or more, still more preferably 0.36 or more, further still more preferably 0.37 or more, yet still more preferably 0.38 or more. A colloidal index of 0.30 or more further enhances the softening point and the rutting resistance (G*/sin δ). The colloidal index is preferably 0.53 or less, more preferably 0.52 or less, still more preferably 0.51 or less, further still more preferably 0.50 or less. A colloidal index of 0.54 or less further enhances the applicability (low melt viscosity) and the ductility.

The saturate fraction content is preferably 10.0% by mass or less, more preferably 9.5% by mass or less, still more preferably 9.0% by mass or less. A saturate fraction content of 11.0% by mass or less tends to further enhance the softening point and the rutting resistance (G*/sin δ). The saturate fraction content is preferably 4% by mass or more, more preferably 5% by mass or more, still more preferably 5.5% by mass or more. A saturate fraction content of 6% by mass or more tends to further enhance the applicability (low melt viscosity) and the ductility.

The asphaltene fraction content is preferably 25% by mass or less, more preferably 24% by mass or less, still more preferably 23% by mass or less. An asphaltene fraction content of 26% by mass or less tends to further enhance the applicability (low melt viscosity) and the ductility. The asphaltene fraction content is preferably 18% by mass or more, more preferably 18.5% by mass or more, still more preferably 19% by mass or more. An asphaltene fraction content of 16% by mass or more tends to further enhance the softening point and the rutting resistance (G*/sin δ).

The resin fraction content is preferably 29% by mass or less, more preferably 28% by mass or less, still more preferably 27.5% by mass or less. A resin fraction content of 30% by mass or less tends to further enhance the ductility. The resin fraction content is preferably 19% by mass or more, more preferably 20% by mass or more, still more preferably 20.5% by mass or more. A resin fraction content of 18% by mass or more tends to further enhance the softening point, the rutting resistance (G*/sin δ), and the applicability (low melt viscosity).

The aromatic fraction content is preferably 58% by mass or less, more preferably 56% by mass or less, still more preferably 54% by mass or less. An aromatic fraction content of 60% by mass or less tends to further enhance the softening point and the rutting resistance (G*/sin δ). The aromatic fraction content is preferably 38% by mass or more, more preferably 40% by mass or more, still more preferably 42% by mass or more. An aromatic fraction content of 35% by mass or more tends to further enhance the applicability (low melt viscosity) and the ductility.

The colloidal index (Ci) of the asphalt and the peak temperature (Tg (° C.)) of the loss tangent in the spectrum of the dynamic viscoelasticity of the block copolymer preferably satisfy the following relationship. Satisfaction of this relationship tends to further enhance the softening point and the rutting resistance.

$$Ci \leq 0.0127 \times Tg + 0.94$$

The peak top of the loss tangent at this time is in the range of preferably −70° C. or more and 0° C. or less, more preferably −50° C. or more and −10° C. or less, still more preferably −45° C. or more and −20° C. or less.

Throughout the specification, the term "saturate fraction" indicates oil contents having a molecular weight of 300 to 2,000, i.e., paraffin and naphthene. The term "asphaltene fraction" indicates a condensed polycyclic aromatic compound having a molecular weight of 1,000 to 100,000 and a layered structure. The term "resin fraction" indicates a condensed polycyclic aromatic resin having a molecular weight of 500 to 50,000. The "aromatic fraction" indicates an aromatic oil content having a molecular weight of 500 to 2,000. These components can be analyzed by a measurement method according to JPI-5S-70-10 of JPI Standard and Manuals Testing Method for Petroleum Products specified by the Japan Petroleum Institute.

The colloidal index and the saturate fraction can be determined by the method in Examples described later.

The penetration of the asphalt is preferably more than 40 and 120 or less, preferably 50 or more and 100 or less, more preferably 60 or more and 120 or less. A penetration of the asphalt of more than 40 tends to decrease the melt viscosity and further enhance the ductility. A penetration of the asphalt of 120 or less tends to further enhance the softening point and the rutting resistance. The penetration of the asphalt can be measured by the method described in Examples. The penetration of the asphalt can be adjusted through control of the conditions of refining of petroleum, such as temperature, time, and reduced pressure.

The content of the block copolymer is 0.5 parts by mass or more and 20 parts by mass or less, preferably 1 part by mass or more and 18 parts by mass or less, more preferably 2 parts by mass or more and 15 parts by mass or less based on 100 parts by mass of the asphalt from the viewpoint of the balance of performance between the melt viscosity and the softening point and the rutting resistance (G*/sin δ). In applications to road pavement requiring low melt viscosity from the viewpoint of the applicability, a preferred content of the block copolymer is preferably 0.5 parts by mass or more and 15 parts by mass or less based on 100 parts by mass of the asphalt. In applications to asphalt waterproof sheets requiring higher softening point and ductility, a preferred content of the block copolymer is preferably 2 parts by mass or more and 20 parts by mass or less based on 100 parts by mass of the asphalt.

[Other Components]

The asphalt composition according to the present embodiment can contain components described later in addition to the block copolymer and the asphalt described above.
(Polymers Other than Block Copolymer Described Above)

Polymers other than the block copolymer described above can be contained in view of a high softening point, high oil resistance, or economy. Examples of the other polymers include, but should not be particularly limited to, natural rubber, polyisoprene rubber, polybutadiene rubber, styrene butadiene rubber, styrene-butadiene-styrene block copolymers (SBS), styrene-butadiene-butylene-styrene copolymers (SBBS), styrene-ethylene-butylene-styrene copolymers (SEBS), olefin elastomers such as ethylene propylene copolymers; ethylene-ethyl acrylate copolymers, chloroprene rubber, acrylic rubber, and ethylene vinyl acetate copolymers.

Among these polymers, preferred are styrene-butadiene-styrene block copolymers (SBS) in view of low viscosity and high ductility of the asphalt composition. Furthermore, more preferred are SBSs containing styrene-butadiene diblock portions. Examples of SBS include D1101 and D1184 manufactured by Kraton Performance Polymers, Inc.
(Tackifier)

The asphalt composition according to the present embodiment may contain a tackifier. Examples of the tackifier include, but should not be particularly limited to, known tackifiers such as rosin resins, hydrogenated rosin resins, terpene resins, coumarone resins, phenol resins, terpene-phenol resins, aromatic hydrocarbon resin, and aliphatic hydrocarbon resins.

These tackifiers may be used singly or in the form of a mixture. Specific examples of usable tackifiers include those described in "Gomu/Purasutikku Haigo Yakuhin (Rubber/Plastic Compounding Chemicals)" (edited by Rubber Digest).

Use of the tackifier improves the applicability and the elastic modulus of the asphalt composition according to the present embodiment. The content of the tackifier in the asphalt composition according to the present embodiment is in the range of preferably 0 to 200 parts by mass, more preferably 10 to 100 parts by mass when the block copolymer is 100 parts by mass. A content within this range ensures the effect of improving the applicability and the elastic modulus.
(Softening Agent)

The asphalt composition according to the present embodiment may contain a softening agent. Usable softening agents are both mineral oil softening agents and synthetic resin softening agents. Examples of mineral oil softening agents usually include paraffinic oils, naphthenic oils, and aromatic oils.

A type in which the number of carbon atoms of a paraffinic hydrocarbon is 50% or more of the total number of carbon atoms is called a paraffinic oil. A type in which the number of carbon atoms of a naphthenic hydrocarbon is 30 to 45% of the total number of carbon atoms is called a naphthenic oil. A type in which the number of carbon atoms of an aromatic hydrocarbon is 35% or more of the total number of carbon atoms is called an aromatic oil.

Examples of preferred synthetic resin softening agents include, but should not be particularly limited to, polybutene and low molecular weight polybutadiene. A preferred softening agent is a paraffinic oil, which is a softening agent for rubber. Addition of the softening agent improves the applicability of the asphalt composition according to the present embodiment.

The content of the softening agent in the asphalt composition according to the present embodiment is preferably 0 to 100 parts by mass, more preferably in the range of 0 to 50 parts by mass, still more preferably in the range of 2 to 30 parts by mass when the block copolymer is 100 parts by mass to prevent bleed of the softening agent and ensure the practically sufficient mechanical strength of the asphalt composition according to the present embodiment.

(Stabilizer)

The asphalt composition according to the present embodiment may contain a variety of stabilizers such as antioxidants and light stabilizers.

Examples of the antioxidant include, but should not be particularly limited to, hindered phenol antioxidants such as 2,6-di-t-butyl-4-methylphenol, n-octadecyl-3-(4'-hydroxy-3',5'-di-t-butylphenyl)propionate, 2,2'-methylenebis(4-methyl-6-t-butylphenol), 2,2'-methylenebis(4-ethyl-6-t-butylphenol), 2,4-bis[(octylthio)methyl]-o-cresol, 2-t-butyl-6-(3-t-butyl-2-hydroxy-5-methylbenzyl)-4-methylphenyl acrylate, 2,4-di-t-amyl-6-[1-(3,5-di-t-amyl-2-hydroxyphenyl)ethyl]phenyl acrylate, and 2-[1-(2-hydroxy-3,5-di-tert-pentylphenyl)]acrylate; sulfur antioxidants such as dilauryl thiodipropionate, lauryl stearyl thiodipropionate, and pentaerythritol-tetrakis(β-laurylthiopropionate); and phosphorus antioxidants such as tris(nonylphenyl)phosphite and tris(2,4-di-t-butylphenyl)phosphite.

Examples of the light stabilizers include benzotriazole ultraviolet absorbing agents such as 2-(2'-hydroxy-5'-methylphenyl)benzotriazole, 2-(2'-hydroxy-3',5'-t-butylphenyl)benzotriazole, and 2-(2'-hydroxy-3',5'-di-t-butylphenyl)-5-chlorobenzotriazole; benzophenone ultraviolet absorbing agents such as 2-hydroxy-4-methoxy benzophenone; and hindered amine light stabilizers.

The content of the stabilizer in the asphalt composition according to the present embodiment is preferably 0 to 10 parts by mass, more preferably in the range of 0 to 5 parts by mass, still more preferably in the range of 0 to 3 parts by mass, further still more preferably in the range of 0.2 to 2 parts by mass based on 100 parts by mass of the block copolymer.

(Additives)

The asphalt composition according to the present embodiment can contain a variety of other additives usually used in conventional asphalt compositions, when necessary.

Examples thereof include fillers and reinforcing agents such as silica, talc, calcium carbonate, mineral substance powder, and glass fibers, aggregates of mineral substances, pigments such as red iron oxide and titanium dioxide, waxes such as paraffin wax, microcrystalline wax, and low molecular weight polyethylene wax, foaming agents such as azodicarbonamide, polyolefin or low molecular weight vinyl aromatic thermoplastic resins such as atactic polypropylene and ethylene-ethyl acrylate copolymer, natural rubber, and synthetic rubbers such as polyisoprene rubber, polybutadiene rubber, styrene-butadiene rubber, ethylene-propylene rubber, chloroprene rubber, acrylic rubber, isoprene-isobutylene rubber, polypentenamer rubber, and styrene-butadiene block copolymers other than those of the present invention, styrene-isoprene block copolymers, hydrogenated styrene-butadiene block copolymers, and hydrogenated styrene-isoprene block copolymers.

The content of the additives in the asphalt composition according to the present embodiment is preferably 0 to 100 parts by mass, more preferably in the range of 0 to 50 parts by mass, still more preferably in the range of 0 to 30 parts by mass, further still more preferably in the range of 1 to 20 parts by mass based on 100 parts by mass of the block copolymer.

(Others)

The following substances can be added in addition to the above.

Rubber vulcanizing agents, crosslinking agents: Examples thereof include sulfur, sulfur compounds, inorganic vulcanizing agents other than sulfur, oximes, nitroso compounds, polyamine, organic peroxides, and resin vulcanizing agents.

Plasticizers: Examples thereof include phthalic acid derivatives, tetrahydrophthalic acid derivatives, adipic acid derivatives, azelaic acid derivatives, sebacic acid derivatives, dodecane-2-acid derivatives, maleic acid derivatives, fumaric acid derivatives, trimellitic acid derivatives, pyromellitic acid derivatives, citric acid derivatives, oleic acid derivatives, ricinoleic acid derivatives, sulfonic acid derivatives, phosphoric acid derivatives, glutaric acid derivatives, glycol derivatives, glycerin derivatives, paraffin derivatives, and epoxy derivative.

Nucleating agents: Examples thereof include fatty acid metal salt nucleating agents, sorbitol nucleating agents, and phosphoric acid ester metal salt nucleating agents.

The content of the other components in the asphalt composition according to the present embodiment is preferably 0 to 10 parts by mass, more preferably in the range of 0 to 5 parts by mass, still more preferably in the range of 0 to 3 parts by mass, further still more preferably in the range of 0.2 to 2 parts by mass where the block copolymer is 100 parts by mass in the asphalt composition according to the present embodiment.

The asphalt composition can be used in any form of pavement. Examples thereof include dense graded pavement, drainage pavement, water permeable pavement, fine and gap graded asphalt pavement, stone mastic asphalt pavement, color pavement, semi-flexible pavement, water retaining pavement, and thin layer pavement.

Dense graded pavement mainly requires an improvement in flow resistance and slip resistance. In this case, the content of the block copolymer in the asphalt composition is preferably 3 to 5.5% by mass based on 100% by mass of the asphalt. The composition of the asphalt composition usable in dense graded pavement preferably comprises 40 to 55% by mass of a coarse aggregate, 40 to 50% by mass of a fine aggregate, 3 to 5% by mass of a filler, and 5 to 7%% by mass of the asphalt based on 100% by mass of the total amount of the aggregates and the filler (excluding the asphalt).

Drainage pavement mainly requires an improvement in water drainage, visibility, and noise. In this case, the content of the block copolymer in the asphalt composition is preferably 5 to 10% by mass based on 100% by mass of the asphalt. The composition of the asphalt composition usable in drainage pavement preferably comprises 60 to 85% by mass of a coarse aggregate, 5 to 20% by mass of a fine aggregate, 3 to 5% by mass of a filler, and 4 to 6%% by mass of the asphalt based on 100% by mass of the total amount of the aggregates and the filler (excluding the asphalt).

Water permeable pavement mainly requires an improvement in water permeability. In this case, the content of the block copolymer in the asphalt composition is preferably 0.5 to 6% by mass based on 100% by mass of the asphalt. The composition of the asphalt composition usable in water permeable pavement preferably comprises 60 to 85% by mass of a coarse aggregate, 5 to 20% by mass of a fine aggregate, 3 to 5% by mass of a filler, and 4 to 6% by mass of the asphalt based on 100% by mass of the total amount of the aggregates and the filler (excluding the asphalt).

Fine and gap graded pavement mainly requires an improvement in wear resistance, flow resistance, durability, and slip resistance. In this case, the content of the block copolymer in the asphalt composition is preferably 5 to 12% by mass based on 100% by mass of the asphalt. The composition of the asphalt composition usable in fine and gap graded pavement preferably comprises 50 to 60% by mass of a coarse aggregate, 30 to 40% by mass of a fine aggregate, 3 to 6% by mass of a filler, and 4.5 to 6% by mass of the asphalt based on 100% by mass of the total amount of the aggregates and the filler (excluding the asphalt).

Stone mastic asphalt pavement mainly requires an improvement in wear resistance, water impermeability, stress relaxation, flow resistance, and noise. In this case, the content of the block copolymer in the asphalt composition is preferably 4 to 10% by mass based on 100% by mass of the asphalt. The composition of the asphalt composition usable in stone mastic asphalt pavement comprises 55 to 70% by mass of a coarse aggregate, 15 to 30% by mass of a fine aggregate, 5 to 10% by mass of a filler, and 5.5 to 8% by mass of the asphalt based on 100% by mass of the total amount of the aggregates and the filler (excluding the asphalt).

Semi-flexible pavement mainly requires an improvement in visibility, oil resistance, and flow resistance. In this case, the content of the block copolymer in the asphalt composition is preferably 4 to 10% by mass based on 100% by mass of the asphalt. The composition of the asphalt composition usable in semi-flexible pavement preferably comprises 60 to 85% by mass of a coarse aggregate, 5 to 20% by mass of a fine aggregate, 3 to 5% by mass of a filler, and 4 to 6% by mass of the asphalt based on 100% by mass of the total amount of the aggregates and the filler (excluding the asphalt). Preferred semi-flexible pavement has a porosity of about 15 to 20%, and gaps are filled with cement mortar.

Water retaining pavement mainly requires prevention of an increase in temperature of the pavement and an improvement in water retention. In this case, the content of the block copolymer in the asphalt composition is preferably 4 to 10% by mass based on 100% by mass of the asphalt. The composition of the asphalt composition usable in water retaining pavement comprises 60 to 85% by mass of a coarse aggregate, 5 to 20% by mass of a fine aggregate, 3 to 5% by mass of a filler, and 4 to 6% by mass of the asphalt based on 100% by mass of the total amount of the aggregates and the filler (excluding the asphalt). Preferred water retaining pavement has a porosity of about 15 to 20%, and gaps are filled with a water retaining material such as cement or plaster water retaining material.

Thin layer pavement mainly requires an improvement in economy, a reduction in construction period, and an improvement in applicability. In this case, the content of the block copolymer in the asphalt composition is preferably 4 to 8% by mass based on 100% by mass of the asphalt. The composition of the asphalt composition usable in thin layer pavement preferably comprises 60 to 85% by mass of an aggregate (5 to 2.5 mm), 5 to 20% by mass of a fine aggregate (2.5 mm or less), 3 to 5% by mass of a filler, and 4 to 6.5% by mass of the asphalt based on 100% by mass of the total amount of the aggregates and the filler (excluding the asphalt).

[Method of Producing Asphalt Composition]

The asphalt composition according to the present embodiment can be produced by any production method, such as a method of melt kneading components with heating in a known mixer, a heat melting pot, or a kneader to homogeneously mix the components.

For example, the asphalt is immersed in a heat melting pot at 160° C. to 200° C. (generally around 180° C.) and is completely melted. While the asphalt is being stirred with a stirrer such as a homomixer, the block copolymer and other predetermined additives are added. Subsequently, these materials are kneaded at an increased stirring rate to produce an asphalt composition. Although the stirring rate generally may be appropriately selected according to the apparatus to be used, the stirring rate is generally 100 rpm or more and 8,000 rpm or less, and the stirring time is preferably 30 minutes to 6 hours, more preferably 1 hour to 3 hours.

EXAMPLES

The present invention will now be described in detail by way of specific Examples and Comparative Examples, but the present invention will not be limited to the Examples below. First, the evaluation methods and the methods of measuring physical properties used in the Examples and the Comparative Examples will be described below.

[I. Evaluation of Composition and Structure of Block Copolymer]

(I-1) Content of Vinyl Aromatic Monomer Unit (Styrene Content) in Block Copolymer A predetermined amount of a polymer was dissolved in chloroform. The content of the vinyl aromatic monomer unit (styrene) was calculated from the peak intensity of the absorption wavelength (262 nm) attributed to the vinyl aromatic compound (styrene) based on the calibration curve using an ultraviolet spectrophotometer (manufactured by SHIMADZU Corporation, UV-2450).

(I-2) Content of Polymer Block (A) in Block Copolymer

The measurement was performed by the osmium tetroxide acid method described in I. M. Kolthoff, et al., J. Polym. Sci. 1, p. 429 (1946) to determine the content of the polymer block (A) in the block copolymer. The polymer was decomposed by a solution of 0.1 g/125 mL osmic acid in tertiary butanol.

(I-3) Composition Analysis of Block Copolymer and Hydrogenation Rate

The vinyl content in the partially hydrogenated block copolymer and the hydrogenation rate of the unsaturated group in the conjugated diene were measured by nuclear magnetic resonance spectrometry (NMR) on the following conditions. The block copolymer after the hydrogenation reaction was deposited in a large amount of methanol to deposit the partially hydrogenated block copolymer for recovery. Next, the partially hydrogenated block copolymer was extracted with acetone. The extracted solution was vacuum dried, and the resulting product was used as a sample for measurement by 1H-NMR. The 1H-NMR measurement was performed on the following conditions.

(Conditions on Measurement)

Apparatus for measurement: JNM-LA400 (manufactured by JEOL Ltd.)

Solvent: deuterochloroform

Sample for measurement: block copolymer extracted before and after hydrogenation Sample concentration: 50 mg/mL Frequency for observation: 400 MHz Chemical shift reference: TMS (tetramethylsilane)

Delay of pulse: 2.904 seconds

The number of scans: 64 times

Pulse width: 45°

Temperature for measurement: 26° C.

The content of the alkenyl monomer unit (a1) in the conjugated diene monomer unit (a) hydrogenated, the content of the alkenyl monomer unit (b1) in the conjugated diene monomer unit (b) hydrogenated, the content of the non-hydrogenated alkenyl monomer unit (a2), and the content of the non-hydrogenated alkenyl monomer unit (b2) were calculated based on the 1H-NMR spectrum obtained above.

(I-4) Weight Average Molecular Weight, Molecular Weight Distribution

The measurement was performed using tetrahydrofuran as a solvent at a temperature of 35° C. by GPC [apparatus manufactured by Waters Corporation] to obtain a chromatogram. The weight average molecular weight (molecular weight in terms of polystyrene) and the number average molecular weight were determined from the chromatogram using the calibration curve obtained from the measurement of commercially available standard polystyrenes (created using the peak molecular weights of standard polystyrenes), and the molecular weight distribution was determined from the ratio of the weight average molecular weight to the number average molecular weight.

(I-5) Spectrum of Dynamic Viscoelasticity

The tan δ (loss tangent) peak height and the temperature were determined from the viscoelastic spectrum obtained through measurement with a rheometer ARES (manufactured by TA Instruments-Waters LLC, trade name). A sample for measurement was set on a twisted geometry to measure the sample at a strain of 0.5% and a frequency of 1 Hz.

[II. Composition Analysis of Asphalt]

(II-1) Colloidal Index (Ci)

The saturate fractions, the asphaltene fractions, the resin fractions, and the aromatic fractions of the asphalts were determined with a thin layer chromatography auto detection apparatus (IATROSCAN MK-6: manufactured by Mitsubishi Chemical Medience Corporation, trade name) by a measurement method according to JPI-5S-70-10 of JPI Standard and Manuals Testing Method for Petroleum Products specified by the Japan Petroleum Institute. The colloidal index (Ci) was determined from the following formula:

Ci=(saturate fraction content+asphaltene fraction content)/(resin fraction content+aromatic fraction content)

The colloidal index can also be measured through analysis of the asphalt components extracted from the asphalt applied to road pavement.

(II-2) Penetration of Asphalt

The penetration of the asphalt was determined according to JIS-K 2207 as follows: a sample was kept at 25° C. in a thermostat water bath, and the length of a specified needle invading into the sample for 5 seconds was measured. The asphalt used in the Examples had a penetration of 60 or more and 100 or less in the measurement.

[III. Properties of Asphalt Composition]

(III-1) Melt Viscosity

The melt viscosity was measured at 160° C. and 180° C. with a Brookfield viscometer (type DV-III). If the measured value (mPa·s) of the melt viscosity was 500 or less at 160° C. for road pavement, and was 500 or less at 180° C. for asphalt waterproof sheets, it was determined that such asphalt compositions had high performance in practice. If the measured value (mPa·s) of the melt viscosity was 450 or less on each temperature condition, it was determined that such asphalt compositions had sufficient performance in practice.

(III-2) Softening Point

The softening point of the asphalt composition was measured according to JIS-K2207. A sample was filled into a specified ring. The ring was held horizontally in a glycerin solution. A ball of 3.5 g was placed on the center of the sample. The temperature of the solution was raised at a rate of 5° C./min. When the sample touched the bottom plate of the ring holder due to the weight of the ball, the temperature was measured. If the measured value (° C.) of the softening point was 75 or more, it was determined that such asphalt compositions had high performance in practice. If the measured value (° C.) of the softening point was 82 or more, it was determined that such asphalt compositions had sufficient performance in practice. Furthermore, if the measured value (° C.) of the softening point was 120 or more, it was determined that such asphalt compositions had high performance in practice in application to asphalt waterproof sheets. If the measured value (° C.) of the softening point was 130 or more, it was determined that such asphalt compositions had sufficient performance in practice in application to asphalt waterproof sheets.

(III-3) Ductility

According to JIS-K2207, a sample was poured into a frame to prepare a sample having a predetermined shape, while the sample was kept at 15° C. in a thermostat water bath, the sample was pulled at a rate of 5 cm/min until the sample broke, and the length of elongation of the sample at this time was measured. If the measured value (cm) of the ductility was 55 or more, it was determined that such asphalt compositions had high performance in practice. If the measured value (cm) of the ductility was 60 or more, it was determined that such asphalt compositions had sufficient performance in practice.

(III-4) Storage Stability at High Temperature (Difference in Change in Softening Point)

The asphalt composition immediately after production was heated in an oven at 180° C. for 3 days. Subsequently, a metal can was extracted, and the softening point was measured. The difference between the softening point of the asphalt composition immediately after production and that of the asphalt composition after heated for 3 days was defined as a scale for the storage stability at high temperature. A smaller difference between these softening points indicates higher storage stability at high temperature. If the value (° C.) of the difference between the softening points of the asphalt composition before and after storage at high temperature was 10 or less, it was determined that such an asphalt composition had high performance in practice. If the value (° C.) of the difference between the softening points of the asphalt composition before and after storage at high temperature was 5 or less, it was determined that such an asphalt composition had sufficient performance in practice.

(III-5) Rutting Resistance

The rutting resistance was evaluated using G*/sin δ as an index. G*/sin δ was determined from the viscoelastic spectrum obtained through measurement with a rheometer ARES (manufactured by TA Instruments-Waters LLC, trade name). A sample for measurement was set on a twisted geometry at a strain of 0.5% and a frequency of 1 Hz using a parallel plate having a diameter of 7.9 mm to measure G* (complex modulus) and sin δ. If the measured value (Pa) of G*/sin δ was 750 or more, it was determined that such asphalt compositions had high performance in practice. If the measured value (Pa) of G*/sin δ was 900 or more, it was determined that such asphalt compositions had sufficient performance in practice.

[IV. Preparation of Hydrogenating Catalyst]

2 L of dried and refined cyclohexane was placed in a reaction container purged with nitrogen. 40 mmol of bis(η5-cyclopentadienyl)titanium di-(p-tolyl) and 150 g of 1,2-polybutadiene having a molecular weight of about 1,000 (amount of 1,2-vinyl bond: about 85%) were dissolved, and a solution of 60 mmol of n-butyllithium in cyclohexane was then added to react these materials at room temperature for 5 minutes. 40 mmol of n-butanol was immediately added, was stirred, and the product was stored at room temperature.

[V. Preparation of Block Copolymer]

<Polymer 1>

Polymerization was performed with a tank reactor having an inner volume of 10 L with a stirrer and a jacket by the following method.

(Stage 1)

10 parts by mass of cyclohexane was placed in the reactor, and was adjusted to a temperature of 70° C. 0.058% by mass of n-butyllithium was then added based on the mass of the total monomers (total amount of the butadiene monomer and the styrene monomer charged in the reactor), and 0.4 mol of N,N,N',N'-tetramethylethylenediamine (hereinafter, referred to as TMEDA) was added based on 1 mol of n-butyllithium. Subsequently, a solution of 10.5 parts by mass of styrene in cyclohexane (monomer content: 22% by mass) was added as a monomer over about 3 minutes, and the reaction was performed for 30 minutes while the reactor inner temperature was being adjusted to about 70° C. and the reactor internal pressure was being adjusted to 0.30 MPa.

(Stage 2)

Next, a solution of 56 parts by mass of butadiene in cyclohexane (monomer content: 22% by mass) and a solution of 23 parts by mass of styrene in cyclohexane (monomer content: 22% by mass) were continuously fed to the reactor at a predetermined rate over 30 minutes and 10 minutes, respectively. The reaction was then performed for 30 minutes. During the reaction, the reactor inner temperature was adjusted to about 70° C., and the reactor internal pressure was adjusted to 0.30 MPa.

(Stage 3)

Subsequently, a solution of 10.5 parts by mass of styrene in cyclohexane (monomer content: 22% by mass) was further added as a monomer over about 3 minutes, and the reaction was performed for 30 minutes while the reactor inner temperature was being adjusted to about 70° C. and the reactor internal pressure was being adjusted to 0.30 MPa. A block copolymer was thereby prepared.

Next, the hydrogenating catalyst was added to the resulting block copolymer in an amount of 95 ppm of titanium based on the mass of the block copolymer. A hydrogenation reaction was performed at a hydrogen pressure of 0.7 MPa and a temperature of 65° C. After the reaction was completed, methanol was added, and 0.3% by mass of a stabilizer octadecyl-3-(3,5-di-t-butyl-4-hydroxyphenyl)propionate was added based on the mass of the block copolymer to prepare a hydrogenated block copolymer (hereinafter, referred to as Polymer 1). The hydrogenation rate was 87%.

<Polymer 2>

Polymerization was performed by the same method as in Polymer 1 except that the amount of n-butyllithium to be fed was 0.037% by mass, the amount of styrene to be fed in Stage 1 was changed to 10 parts by mass, the amount of butadiene to be fed in Stage 2 was changed to 70 parts by mass, the amount of styrene to be fed in Stage 2 was changed to 10 parts by mass, the time to add butadiene was changed to 15 minutes, and the amount of styrene to be fed in Stage 3 was changed to 10 parts by mass.

Next, a hydrogenation reaction was performed in the same manner as in Polymer 1 except that the hydrogenating catalyst was added to the resulting block copolymer in an amount of 93 ppm of titanium based on the mass of the block copolymer. A hydrogenated block copolymer (hereinafter, referred to as Polymer 2) was thereby prepared. The hydrogenation rate was 84%.

<Polymer 3>

Polymerization was performed by the same method as in Polymer 1 except that the amount of n-butyllithium to be fed was 0.063% by mass, the amount of styrene to be fed in Stage 1 was changed to 17.5 parts by mass, the amount of butadiene to be fed in Stage 2 was changed to 50 parts by mass, the amount of styrene to be fed in Stage 2 was changed to 15 parts by mass, and the amount of styrene to be fed in Stage 3 was changed to 17.5 parts by mass.

Next, a hydrogenation reaction was performed in the same manner as in Polymer 1 except that the hydrogenating catalyst was added to the resulting block copolymer in an amount of 90 ppm of titanium based on the mass of the block copolymer. A hydrogenated block copolymer (hereinafter, referred to as Polymer 3) was thereby prepared. The hydrogenation rate was 80%.

<Polymer 4>

Polymerization was performed by the same method as in Polymer 1 except that the amount of n-butyllithium to be fed was 0.045% by mass, the amount of styrene to be fed in Stage 1 was changed to 7.5 parts by mass, the amount of butadiene to be fed in Stage 2 was changed to 62 parts by mass, the time to add butadiene was changed to 20 minutes, and the amount of styrene to be fed in Stage 3 was changed to 7.5 parts by mass.

Next, a hydrogenation reaction was performed in the same manner as in Polymer 1 except that the hydrogenating catalyst was added to the resulting block copolymer in an amount of 80 ppm of titanium based on the mass of the block copolymer. A hydrogenated block copolymer (hereinafter, referred to as Polymer 4) was thereby prepared. The hydrogenation rate was 62%.

<Polymer 5>

Polymerization was performed by the same method as in Polymer 1 except that the amount of n-butyllithium to be fed was 0.077% by mass, the amount of styrene to be fed in Stage 1 was changed to 12.5 parts by mass, the amount of butadiene to be fed in Stage 2 was changed to 45 parts by mass, the amount of styrene to be fed in Stage 2 was changed to 30 parts by mass, the time to add butadiene was changed to 45 minutes, the amount of styrene to be fed in Stage 3 was changed to 12.5 parts by mass, the reactor inner temperature was adjusted to 85° C., and the reactor internal pressure was adjusted to 0.42 MPa.

Next, a hydrogenation reaction was performed in the same manner as in Polymer 1 except that the hydrogenating catalyst was added to the resulting block copolymer in an amount of 68 ppm of titanium based on the mass of the block copolymer, and the reactor inner temperature was 85° C. A hydrogenated block copolymer (hereinafter, referred to as Polymer 5) was thereby prepared. The hydrogenation rate was 45%.

<Polymer 6>

Polymerization was performed by the same method as in Polymer 1 except that the amount of n-butyllithium to be fed was 0.056% by mass, the amount of styrene to be fed in Stage 1 was changed to 10 parts by mass, the amount of butadiene to be fed in Stage 2 was changed to 57 parts by mass, the time to add butadiene was changed to 25 minutes, and the amount of styrene to be fed in Stage 3 was changed to 10 parts by mass.

Next, a hydrogenation reaction was performed in the same manner as in Polymer 1 except that the hydrogenating catalyst was added to the resulting block copolymer in an amount of 75 ppm of titanium based on the mass of the block copolymer. A hydrogenated block copolymer (hereinafter, referred to as Polymer 6) was thereby prepared. The hydrogenation rate was 50%.

<Polymer 7>

Polymerization was performed by the same method as in Polymer 1 except that the amount of n-butyllithium to be fed was 0.070% by mass, the amount of styrene to be fed in Stage 1 was changed to 15.5 parts by mass, the amount of butadiene to be fed in Stage 2 was changed to 30 parts by mass, the amount of styrene to be fed in Stage 2 was changed to 39 parts by mass, the time to add butadiene was changed to 55 minutes, and the amount of styrene to be fed in Stage 3 was changed to 15.5 parts by mass.

Next, a hydrogenation reaction was performed in the same manner as in Polymer 1 except that the hydrogenating catalyst was added to the resulting block copolymer in an amount of 67 ppm of titanium based on the mass of the block copolymer. A hydrogenated block copolymer (hereinafter, referred to as Polymer 7) was thereby prepared. The hydrogenation rate was 43%.

<Polymer 8>

Polymerization was performed by the same method as in Polymer 1 except that the amount of n-butyllithium to be fed was 0.042% by mass, the amount of styrene to be fed in Stage 1 was changed to 6 parts by mass, the amount of butadiene to be fed in Stage 2 was changed to 85 parts by mass, the amount of styrene to be fed in Stage 2 was changed to 3 parts by mass, the time to add butadiene was changed to 10 minutes, and the amount of styrene to be fed in Stage 3 was changed to 6 parts by mass.

Next, a hydrogenation reaction was performed in the same manner as in Polymer 1 except that the hydrogenating catalyst was added to the resulting block copolymer in an amount of 94 ppm of titanium based on the mass of the block copolymer. A hydrogenated block copolymer (hereinafter, referred to as Polymer 8) was thereby prepared. The hydrogenation rate was 85%.

<Polymer 9>

Polymerization was performed by the same method as in Polymer 1 except that the amount of n-butyllithium to be fed was 0.048% by mass, the amount of styrene to be fed in Stage 1 was changed to 4 parts by mass, the amount of butadiene to be fed in Stage 2 was changed to 78 parts by mass, the amount of styrene to be fed in Stage 2 was changed to 14 parts by mass, the time to add butadiene was changed to 10 minutes, and the amount of styrene to be fed in Stage 3 was changed to 4 parts by mass.

Next, a hydrogenation reaction was performed in the same manner as in Polymer 1 except that the hydrogenating catalyst was added to the resulting block copolymer in an amount of 96 ppm of titanium based on the mass of the block copolymer. A hydrogenated block copolymer (hereinafter, referred to as Polymer 9) was thereby prepared. The hydrogenation rate was 87%.

<Polymer 10>

Polymerization was performed by the same method as in Polymer 1 except that the amount of n-butyllithium to be fed was 0.062% by mass, the amount of styrene to be fed in Stage 1 was changed to 23 parts by mass, the amount of butadiene to be fed in Stage 2 was changed to 50 parts by mass, the amount of styrene to be fed in Stage 2 was changed to 5 parts by mass, and the amount of styrene to be fed in Stage 3 was changed to 22 parts by mass.

Next, the resulting block copolymer was subjected to a hydrogenation reaction in the same manner as in Polymer 1 to prepare a hydrogenated block copolymer (hereinafter, referred to as Polymer 10). The hydrogenation rate was 84%.

<Polymer 11>

Polymerization was performed by the same method as in Polymer 1 except that the amount of n-butyllithium to be fed was 0.057% by mass, the amount of styrene to be fed in Stage 1 was changed to 15 parts by mass, the amount of butadiene to be fed in Stage 2 was changed to 51 parts by mass, the amount of styrene to be fed in Stage 2 was changed to 19 parts by mass, the time to add butadiene was changed to 35 minutes, the reactor inner temperature was adjusted to 75° C., and the amount of styrene to be fed in Stage 3 was changed to 15 parts by mass.

Next, a hydrogenation reaction was performed in the same manner as in Polymer 1 except that the hydrogenating catalyst was added to the resulting block copolymer in an amount of 65 ppm of titanium based on the mass of the block copolymer. A hydrogenated block copolymer (hereinafter, referred to as Polymer 11) was thereby prepared. The hydrogenation rate was 34%.

<Polymer 12>

Polymerization was performed by the same method as in Polymer 1 except that the amount of styrene to be fed in Stage 1 was changed to 10 parts by mass, the amount of butadiene to be fed in Stage 2 was changed to 57 parts by mass, the time to add butadiene was changed to 25 minutes, and the amount of styrene to be fed in Stage 3 was changed to 10 parts by mass.

Next, a hydrogenation reaction was performed in the same manner as in Polymer 1 except that the hydrogenating catalyst was added to the resulting block copolymer in an amount of 35 ppm of titanium based on the mass of the block copolymer. A hydrogenated block copolymer (hereinafter, referred to as Polymer 12) was thereby prepared. The hydrogenation rate was 9%.

<Polymer 13>

Polymerization was performed by the same method as in Polymer 1 except that the amount of styrene to be fed in Stage 1 was changed to 9 parts by mass, the amount of butadiene to be fed in Stage 2 was changed to 60 parts by mass, the amount of styrene to be fed in Stage 2 was changed to 22 parts by mass, the time to add butadiene was changed to 8 minutes, and the amount of styrene to be fed in Stage 3 was changed to 9 parts by mass.

Next, a hydrogenation reaction was performed in the same manner as in Polymer 1 except that the hydrogenating catalyst was added to the resulting block copolymer in an amount of 85 ppm of titanium based on the mass of the block copolymer. A hydrogenated block copolymer (hereinafter, referred to as Polymer 13) was thereby prepared. The hydrogenation rate was 75%.

<Polymer 14>

Polymerization was performed by the same method as in Polymer 1 except that the amount of n-butyllithium to be fed was 0.065% by mass, the amount of styrene to be fed in Stage 1 was changed to 10 parts by mass, the amount of butadiene to be fed in Stage 2 was changed to 50 parts by mass, the amount of styrene to be fed in Stage 2 was changed to 30 parts by mass, the time to add butadiene was changed to 40 minutes, the amount of styrene to be fed in Stage 3 was changed to 10 parts by mass, the reactor inner temperature was adjusted to 95° C., and the reactor internal pressure was adjusted to 0.52 MPa.

Next, a hydrogenation reaction was performed in the same manner as in Polymer 1 except that the hydrogenating catalyst was added to the resulting block copolymer in an amount of 85 ppm of titanium based on the mass of the block copolymer. A hydrogenated block copolymer (hereinafter, referred to as Polymer 14) was thereby prepared. The hydrogenation rate was 70%.

<Polymer 15>

Polymerization was performed by the same method as in Polymer 1 except that the amount of n-butyllithium to be fed was 0.062% by mass, the amount of styrene to be fed in Stage 1 was changed to 20 parts by mass, the amount of butadiene to be fed in Stage 2 was changed to 61 parts by mass, styrene was not added in Stage 2, and the amount of styrene to be fed in Stage 3 was changed to 19 parts by mass.

Polymer 15 was prepared without performing a hydrogenation reaction. The hydrogenation rate was 0%.

<Polymer 16>

Polymerization was performed by the same method as in Polymer 1 except that the amount of styrene to be fed in Stage 1 was changed to 7.5 parts by mass, the amount of butadiene to be fed in Stage 2 was changed to 30 parts by mass, the amount of styrene to be fed in Stage 2 was changed to 55 parts by mass, the time to add butadiene was changed to 70 minutes, and the amount of styrene to be fed in Stage 3 was changed to 7.5 parts by mass.

Next, a hydrogenation reaction was performed in the same manner as in Polymer 1 except that the hydrogenating catalyst was added to the resulting block copolymer in an amount of 99 ppm of titanium based on the mass of the block copolymer. A hydrogenated block copolymer (hereinafter, referred to as Polymer 16) was thereby prepared. The hydrogenation rate was 98%. The properties of the block copolymers were shown in Table 1.

<Polymer 17>

Polymerization was performed by the same method as in Polymer 1 except that the amount of n-butyllithium to be fed was 0.057% by mass, the amount of styrene to be fed in Stage 1 was 10 parts by mass, the amount of butadiene to be fed in Stage 2 was 57 parts by mass, the time to add butadiene was 25 minutes, and after 10 parts by mass of styrene to be fed in Stage 3 was added, 0.9 mol of N,N'-dimethylpropyleneurea was added based on 1 mol of n-butyllithium added before the first step.

Next, a hydrogenation reaction was performed in the same manner as in Polymer 1 except that the hydrogenating catalyst was added to the resulting block copolymer in an amount of 80 ppm of titanium based on the mass of the block copolymer. A hydrogenated block copolymer (hereinafter, referred to as Polymer 17) was thereby prepared. The hydrogenation rate was 50%.

<Polymer 18>

Polymerization was performed by the same method as in Polymer 1 except that 0.05 mol of TMEDA was added to 1 mol of n-butyllithium, the amount of n-butyllithium to be fed was 0.105 parts by mass, the amount of styrene to be fed in Stage 1 was 15 parts by mass, the amount of butadiene to be fed in Stage 2 was 70 parts by mass, styrene was not added in Stage 2, and after 15 parts by mass of styrene to be fed in Stage 3 was added, dimethyldichlorosilane was added. Polymer 18 was prepared without performing a hydrogenation reaction. The hydrogenation rate was 0%.

<Polymer: EVA> ethylene/vinyl acetate copolymer (EVA): EV460 (manufactured by DU PONT-MITSUI POLYCHEMICALS CO., LTD., trade name, VA content: 19%)

TABLE 1

|  | Styrene content (% by mass) | Content of polymer block (A) (% by mass) | Hydrogenation rate (%) | Vinyl bond content (% by mass) | Conjugated diene monomer unit (a) (% by mass) | | Conjugated diene monomer unit (b) (% by mass) | |
|---|---|---|---|---|---|---|---|---|
|  |  |  |  |  | Hydrogenated (a1) | Non-hydrogenated (a2) | Hydrogenated (b1) | Non-hydrogenated (b2) |
| Polymer 1 | 44 | 21 | 87 | 30 | 28 | 2 | 59 | 11 |
| Polymer 2 | 30 | 20 | 84 | 45 | 42 | 3 | 42 | 13 |
| Polymer 3 | 50 | 35 | 80 | 20 | 18 | 2 | 62 | 18 |
| Polymer 4 | 38 | 15 | 62 | 26 | 21 | 5 | 41 | 33 |
| Polymer 5 | 55 | 25 | 45 | 18 | 14 | 4 | 31 | 51 |
| Polymer 6 | 43 | 20 | 50 | 37 | 32 | 5 | 18 | 45 |
| Polymer 7 | 70 | 31 | 43 | 39 | 37 | 2 | 6 | 55 |
| Polymer 8 | 15 | 12 | 85 | 21 | 19 | 2 | 2 | 77 |
| Polymer 9 | 22 | 8 | 87 | 18 | 17 | 1 | 69 | 13 |
| Polymer 10 | 50 | 45 | 84 | 33 | 30 | 3 | 54 | 13 |
| Polymer 11 | 49 | 30 | 34 | 33 | 26 | 7 | 8 | 59 |
| Polymer 12 | 43 | 20 | 9 | 27 | 27 | 0 | 72 | 1 |
| Polymer 13 | 40 | 18 | 75 | 20 | 17 | 3 | 58 | 22 |
| Polymer 14 | 50 | 20 | 70 | 37 | 33 | 4 | 37 | 26 |
| Polymer 15 | 39 | 39 | 0 | 21 | 0 | 21 | 0 | 79 |
| Polymer 16 | 70 | 15 | 98 | 15 | 15 | 0 | 83 | 2 |
| Polymer 17 | 42 | 20 | 50 | 37 | 32 | 5 | 18 | 45 |
| Polymer 18 | 30 | 30 | 0 | 12 | 0 | 12 | 0 | 88 |

|  | Mw (ten thousands) | tanδ peak | | 0.0127 × Tg + 0.94 |
|---|---|---|---|---|
|  |  | Temperature (° C.) | Height |  |
| Polymer 1 | 18 | −32 | 1.1 | 0.534 |
| Polymer 2 | 28 | −45 | 0.9 | 0.369 |
| Polymer 3 | 17 | −39 | 1.1 | 0.445 |

TABLE 1-continued

| | | | | |
|---|---|---|---|---|
| Polymer 4 | 25 | −38 | 1.3 | 0.457 |
| Polymer 5 | 13 | −27 | 1.4 | 0.597 |
| Polymer 6 | 19 | −41 | 1.2 | 0.419 |
| Polymer 7 | 15 | −18 | 1.6 | 0.711 |
| Polymer 8 | 27 | −65 | 0.6 | 0.115 |
| Polymer 9 | 23 | −43 | 1 | 0.394 |
| Polymer 10 | 17 | −43 | 0.7 | 0.394 |
| Polymer 11 | 19 | −40 | 1.3 | 0.432 |
| Polymer 12 | 18 | −45 | 1.2 | 0.369 |
| Polymer 13 | 18 | −36 | 0.5 | 0.483 |
| Polymer 14 | 16 | −30 | 2.1 | 0.559 |
| Polymer 15 | 17 | −80 | 0.3 | −0.076 |
| Polymer 16 | 18 | 5 | 1.5 | 1.004 |
| Polymer 17 | 19 | −41 | 1.2 | 0.419 |
| Polymer 18 | 15 | −80 | 0.65 | −0.076 |

Example 1

400 g of a straight asphalt (manufactured by Rekiseikouyu Co., Ltd. (Korea)) having a colloidal index (Ci value) of 0.36 and comprising 5.4% by mass of saturate fraction, 52.78% by mass of aromatic fraction, 20.69% by mass of resin fraction, and 21.13% by mass of asphaltene fraction was placed in a 750 cc container. The container was immersed in an oil bath at 180° C. to completely dissolve the straight asphalt.

Next, while the straight asphalt was being stirred at a rotational speed of 3000 rpm with a homomixer, 14 g of the block copolymer thus obtained (Polymer 1) was added to the straight asphalt little by little. After addition was completed, the stirring rate was raised to 6000 rpm, and the materials were kneaded for 30 minutes to prepare an asphalt composition. The physical properties of the asphalt composition were shown in Table 2.

Examples 2 to 9, Comparative Examples 1 to 8

As shown in Table 2 below, asphalt compositions were prepared by the same kneading method as in Example 1 using predetermined polymers in the same proportion of each block copolymer and the asphalt as that in Example 1. The physical properties of the asphalt compositions were shown in Table 2. The asphalt having a colloidal index (Ci value) of 0.36 used was a straight asphalt 60-80, manufactured by Rekiseikouyu Co., Ltd., Korea.

Example 10

As shown in Table 2 below, an asphalt composition was prepared by the same kneading method as in Example 1 except that 8 g of Polymer 6 and 8 g of Polymer 18 were added. The physical properties of the asphalt composition were shown in Table 2.

Example 11

As shown in Table 2 below, an asphalt composition was prepared by the same kneading method as in Example 1 except that 12 g of Polymer 17 and 4 g of EVA polymer were added. The physical properties of the asphalt composition were shown in Table 2.

Example 12

As shown in Table 2 below, an asphalt composition was prepared in the same manner as in Example 1 except that after 14 g of Polymer 6 was added, 0.1% by mass of sulfur was added to the asphalt composition, and the materials were stirred for 120 minutes after addition, and were cured at 160° C. for 12 hours to prepare an asphalt composition. The physical properties of the asphalt composition were shown in Table 2.

Example 13

As shown in Table 2 below, an asphalt composition was prepared in the same manner as in Example 12 except that after 8 g of Polymer 6 and 8 g of Polymer 18 were added, 0.2% by mass of polyphosphoric acid (manufactured by KISHIDA CHEMICAL Co., Ltd.) was added to the asphalt composition. The physical properties of the asphalt composition were shown in Table 2.

TABLE 2

| | Components | | Physical properties | | | | |
|---|---|---|---|---|---|---|---|
| | Block copolymer | Asphalt | Softening point (° C.) | Melt viscosity (mPa · s) at. 160° C. | Ductility (cm) at. 15° C. | Storage stability at high temperature (° C.) | $G^*/\sin\delta$ (Pa) |
| Example 1 | Polymer 1 | Colloidal | 85.9 | 443 | 68 | 2 | 1,176 |
| Example 2 | Polymer 2 | index = 0.36 | 87.5 | 487 | 58 | 3 | 1,224 |
| Example 3 | Polymer 3 | Saturate | 86.7 | 438 | 57 | 4 | 1,191 |
| Example 4 | Polymer 4 | fraction = | 83.5 | 465 | 64 | 6 | 890 |
| Example 5 | Polymer 5 | 5.4% by mass | 81.5 | 395 | 61 | 8 | 874 |
| Example 6 | Polymer 6 | | 87.3 | 449 | 63 | 7 | 1,163 |
| Comparative Example 1 | Polymer 7 | | 80.5 | 435 | 47 | 13 | 870 |
| Comparative Example 2 | Polymer 8 | | 71.3 | 451 | 61 | 5 | 515 |
| Comparative Example 3 | Polymer 9 | | 69.2 | 437 | 64 | 4 | 473 |
| Comparative Example 4 | Polymer 10 | | 88.4 | 518 | 37 | 3 | 1,093 |

TABLE 2-continued

| | Components | | Physical properties | | | | |
|---|---|---|---|---|---|---|---|
| | Block copolymer | Asphalt | Softening point (° C.) | Melt viscosity (mPa · s) at. 160° C. | Ductility (cm) at. 15° C. | Storage stability at high temperature (° C.) | G*/sinδ (Pa) |
| Comparative Example 5 | Polymer 11 | | 82.2 | 405 | 47 | 14 | 1,137 |
| Comparative Example 6 | Polymer 12 | | 81.8 | 438 | 46 | 21 | 1,075 |
| Example 7 | Polymer 13 | | 81.0 | 413 | 56 | 9 | 817 |
| Example 8 | Polymer 14 | | 76.1 | 495 | 60 | 3 | 764 |
| Comparative Example 7 | Polymer 15 | | 66.2 | 484 | 58 | 5 | 525 |
| Comparative Example 8 | Polymer 16 | | 66.8 | 533 | 85 | 11 | 531 |
| Example 9 | Polymer 17 | | 89.5 | 463 | 70 | 2 | 1,956 |
| Example 10 | Polymer 6/Polymer 18 | | 90.5 | 480 | 78 | 5 | 1,285 |
| Example 11 | Polymer 17/EVA | | 90.8 | 475 | 75 | 4 | 1,987 |
| Example 12 | Vulcanization of Polymer 6 | | 90.5 | 467 | 59 | 1 | 1,635 |
| Example 13 | Polymer 6/Polymer 18, PPA crosslinked | | 92.8 | 490 | 56 | 1 | 2,080 |

Examples 14 to 16, Comparative Examples 9 to 11

As shown in Table 3 below, asphalt compositions were prepared by the same kneading method as in Example 1 using predetermined polymers in the corresponding proportion of the block copolymer and the asphalt. The physical properties of the asphalt compositions were shown in Table 3. A straight asphalt 60-70 manufactured by *Caladium Middle East FZE* was used as an asphalt having a colloidal index (Ci value) of 0.5 (saturate fraction: 10.6% by mass, aromatic fraction: 43.1% by mass, resin fraction: 23.6% by mass, asphaltene fraction: 22.6% by mass). A straight asphalt 60-80 manufactured by Negishi Refinery, JX Nikko Nisseki Energy Kabushiki Kaisha, was used as an asphalt having a colloidal index (Ci value) of 0.28 (saturate fraction: 4.52% by mass, aromatic fraction: 59.16% by mass, resin fraction: 19.06% by mass, asphaltene fraction: 17.27% by mass). A straight asphalt 70-80 manufactured by Petro Chem was used as an asphalt having a colloidal index (Ci value) of 0.55. A similar asphalt to those above was used as an asphalt having a colloidal index (Ci value) of 0.36.

Examples 17 to 20

As shown in Table 3 below, the asphalts used in Example 17 and Example 20 were a straight asphalt 60-80 made in Korea having a colloidal index (Ci value) of 0.41 (saturate fraction: 7.4% by mass, aromatic fraction: 47.8% by mass, resin fraction: 23.3% by mass, asphaltene fraction: 21.5% by mass). The asphalts used in Example 18 and Example 19 were a straight asphalt 80-100 made in India having a colloidal index (Ci value) of 0.44 (saturate fraction: 5.8% by mass, aromatic fraction: 42.4% by mass, resin fraction: 27.2% by mass, asphaltene fraction: 24.6% by mass). Asphalt compositions were prepared by the same kneading method as in Example 1 except that Polymer 6 was used in Example 17 and Example 19, Polymer 4 was used in Example 18, and Polymer 2 was used in Example 20. The physical properties of the asphalt compositions were shown in Table 2.

TABLE 3

| | Components | | | | | Physical properties | | | | |
|---|---|---|---|---|---|---|---|---|---|---|
| | Block copolymer | | Asphalt | | | | | | Storage | |
| | Polymer | Amount compounded (parts by mass) | Colloidal index | Saturate fraction (% by mass) | Amount compounded (parts by mass) | Softening point (° C.) | Melt viscosity (mPa · s) at. 160° C. | Ductility (cm) at. 15° C. | stability at high temperature (° C.) | G*/sinδ (Pa) |
| Example 14 | Polymer 1 | 5 | 0.36 | 5.4 | 100 | 91.8 | 496 | 66 | 4 | 1,517 |
| Example 15 | Polymer 1 | 15 | 0.36 | 5.4 | 100 | 132.7 | 489*1 | 58 | 6 | 2,324 |
| Example 16 | Polymer 1 | 3.5 | 0.5 | 10.6 | 100 | 80.5 | 453 | 77 | 5 | 923 |
| Comparative Example 9 | Polymer 1 | 3.5 | 0.28 | 4.5 | 100 | 68.4 | 358 | 78 | 11 | 746 |
| Comparative Example 10 | Polymer 1 | 25 | 0.36 | 5.4 | 100 | 150 or more | *2 | 38 | 18 | 3,625 |
| Comparative Example 11 | Polymer 1 | 3.5 | 0.55 | 16.6 | 100 | 85.3 | 451 | 47 | 15 | 1,034 |
| Example 17 | Polymer 6 | 3.5 | 0.41 | 7.4 | 100 | 85 | 430 | 68 | 5 | 912 |
| Example 18 | Polymer 4 | 3.5 | 0.44 | 5.8 | 100 | 92 | 450 | 66 | 5 | 933 |
| Example 19 | Polymer 6 | 3.5 | 0.44 | 5.8 | 100 | 77 | 480 | 55 | 8 | 770 |
| Example 20 | Polymer 2 | 3.5 | 0.41 | 7.4 | 100 | 78 | 490 | 56 | 8 | 780 |

*1 Measured at a temperature of 180° C.
*2 Measurement impossible due to excessively high viscosity As described above, it was demonstrated that the asphalt compositions according to the present invention have high softening points, high ductility, low melt viscosity, high rutting resistance, and high storage stability at high temperature. It was demonstrated that the asphalt compositions in Examples 1 to 13 were excellent in applications to road pavement, the asphalt compositions in Examples 14 to 16 were excellent in applications to asphalt waterproof sheets, and these asphalt compositions have high processability.

This application is based on Japanese Patent Application No. 2014-096959, filed with Japan Patent Office on May 8, 2014, the contents of which are incorporated herein by reference.

INDUSTRIAL APPLICABILITY

The asphalt composition according to the present invention has industrial applicability as the asphalt for road pavement and asphalt waterproof sheets, and can be suitably used particularly in the field of road pavement.

The invention claimed is:

1. An asphalt composition, comprising
0.5 parts by mass or more and 20 parts by mass or less of a block copolymer, and
100 parts by mass of an asphalt;
wherein the block copolymer comprises a polymer block (A) mainly comprising a vinyl aromatic monomer unit, and a copolymer block (B) comprising a conjugated diene monomer unit and a vinyl aromatic monomer unit; the content of the vinyl aromatic monomer unit in the block copolymer being 20% by mass or more and 60% by mass or less;
wherein a content of the polymer block (A) in the block copolymer is 10% by mass or more and 40% by mass or less;
wherein a hydrogenation rate of a double bond in the conjugated diene monomer unit of the block copolymer is 40% or more and 100% or less;
wherein the asphalt has a colloidal index ((a saturate fraction content+an asphaltene fraction content)/(a resin fraction content+an aromatic fraction content)) of 0.30 or more and 0.54 or less, and a saturate fraction content of 11% by mass or less,
wherein the conjugated diene monomer unit of the block copolymer comprises a conjugated diene monomer unit (a) derived from a 1,2-bond and/or a 3,4-bond and a conjugated diene monomer unit (b) derived from a 1,4-bond, and
wherein a total content of the conjugated diene monomer units is 100% by mass,
wherein a content of an alkenyl monomer unit (a1) in the conjugated diene monomer unit (a) hydrogenated is 10% by mass or more and 50% by mass or less,
wherein a content of an alkenyl monomer unit (b1) in the conjugated diene monomer unit (b) hydrogenated is 0% by mass or more and 80% by mass or less, and
wherein a sum of contents of a non-hydrogenated conjugated diene monomer unit (a2) after hydrogenation and a non-hydrogenated conjugated diene monomer unit (b2) after hydrogenation is 0% by mass or more and 90% by mass or less.

2. The asphalt composition according to claim 1, wherein the block copolymer has a peak top of a loss tangent in the range of −70° C. or more and 0° C. or less in a spectrum of a dynamic viscoelasticity, and a value of the peak top is 0.7 or more and 2.0 or less.

3. The asphalt composition according to claim 1, wherein the block copolymer has a peak top of a loss tangent in the range of −45° C. or more and −20° C. or less in the spectrum of the dynamic viscoelasticity.

4. The asphalt composition according to claim 1, wherein the colloidal index (Ci) of the asphalt and the peak temperature (Tg (° C.)) of the loss tangent in the spectrum of dynamic viscoelasticity of the block copolymer satisfy the following relationship: $Ci \leq 0.0127 \times Tg + 0.94$.

5. The asphalt composition according to claim 1, wherein the hydrogenation rate of the double bond in the conjugated diene monomer unit of the block copolymer is 50% or more and 90% or less.

6. The asphalt composition according to claim 1, wherein the hydrogenation rate of the double bond in the conjugated diene monomer unit of the block copolymer is 60% or more and 90% or less.

7. The asphalt composition according to claim 1, wherein the block copolymer has a weight average molecular weight of 50000 or more and 300000 or less.

8. The asphalt composition according to claim 1, wherein the block copolymer has at least one functional group selected from the group consisting of a hydroxyl group, an acid anhydride group, an epoxy group, an amino group, an amide group, a silanol group, and an alkoxysilane group.

9. The asphalt composition according to claim 1, wherein a content of the conjugated diene monomer unit (a) derived from a 1,2-bond and/or a 3,4-bond is 10% by mass or more and 50% by mass or less based on the total content of the conjugated diene monomer units of the block copolymer.

10. The asphalt composition according to claim 1, wherein the asphalt has a penetration of more than 60 and 80 or less.

11. The asphalt composition according to claim 2, wherein the block copolymer has a peak top of a loss tangent in the range of −45° C. or more and −20° C. or less in the spectrum of the dynamic viscoelasticity.

12. The asphalt composition according to any one of claim 2, wherein the colloidal index (Ci) of the asphalt and the peak temperature (Tg (° C.)) of the loss tangent in the spectrum of dynamic viscoelasticity of the block copolymer satisfy the following relationship: $Ci \leq 0.0127 \times Tg + 0.94$.

13. The asphalt composition according to any one of claim 3, wherein the colloidal index (Ci) of the asphalt and the peak temperature (Tg (° C.)) of the loss tangent in the spectrum of dynamic viscoelasticity of the block copolymer satisfy the following relationship: $Ci \leq 0.0127 \times Tg + 0.94$.

14. The asphalt composition according to claim 2, wherein the hydrogenation rate of the double bond in the conjugated diene monomer unit of the block copolymer is 50% or more and 90% or less.

15. The asphalt composition according to claim 3, wherein the hydrogenation rate of the double bond in the conjugated diene monomer unit of the block copolymer is 50% or more and 90% or less.

16. The asphalt composition according to claim 4, wherein the hydrogenation rate of the double bond in the conjugated diene monomer unit of the block copolymer is 50% or more and 90% or less.

* * * * *